United States Patent
Krause et al.

(10) Patent No.: US 7,346,699 B1
(45) Date of Patent: Mar. 18, 2008

(54) RELIABLE MULTICAST

(75) Inventors: Michael R. Krause, Boulder Creek, CA (US); Fred B. Worley, Santa Clara, CA (US); Kimberly K. Scott, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/578,019

(22) Filed: May 24, 2000

Related U.S. Application Data

(60) Provisional application No. 60/135,664, filed on May 24, 1999, provisional application No. 60/154,150, filed on Sep. 15, 1999.

(51) Int. Cl.
G06F 15/173 (2006.01)
G06F 15/16 (2006.01)

(52) U.S. Cl. .................... 709/232; 709/224

(58) Field of Classification Search ............. 700/201; 714/478; 709/230–237, 224; 370/412–418, 370/429
See application file for complete search history.

(56) References Cited

U.S. PATENT DOCUMENTS

| | | | |
|---|---|---|---|
| 4,475,192 A | 10/1984 | Fernow et al. ............... 370/94 |
| 4,527,267 A | 7/1985 | Cohen | |
| 4,713,806 A * | 12/1987 | Oberlander et al. ......... 370/358 |
| 4,999,771 A | 3/1991 | Ralph et al. | |
| 5,297,143 A | 3/1994 | Fridrich et al. ............ 370/85.3 |
| 5,408,465 A | 4/1995 | Gusella et al. ............... 370/17 |
| 5,506,964 A | 4/1996 | Beukema ............... 395/200.09 |
| 5,535,341 A * | 7/1996 | Shah et al. ................ 710/310 |
| 5,553,083 A * | 9/1996 | Miller ....................... 714/748 |
| 5,699,500 A | 12/1997 | Dasgupta ................... 395/180 |
| 5,699,501 A | 12/1997 | Badovinatz et al. | |
| 5,781,910 A | 7/1998 | Gostanian et al. .......... 707/201 |
| 5,790,544 A | 8/1998 | Aho et al. .................. 370/395 |
| 5,799,146 A | 8/1998 | Badovinatz et al. ..... 395/182.02 |
| 5,802,295 A | 9/1998 | Fukui et al. ........... 395/200.46 |
| 5,916,307 A | 6/1999 | Piskiel et al. .............. 709/300 |
| 5,926,101 A | 7/1999 | Dasgupta ............... 340/825.02 |
| 5,968,176 A * | 10/1999 | Nessett et al. .............. 713/201 |
| 5,987,506 A | 11/1999 | Carter et al. ............... 709/213 |
| 5,999,964 A | 12/1999 | Murakata et al. .......... 709/201 |

(Continued)

OTHER PUBLICATIONS

IBM Corp. "Direct Memory Access Tag Architecture," IBM Technical Disclosure Bulletin, vol. 32, No. 4B, pp. 143-151 (Sep. 1989).

(Continued)

*Primary Examiner*—David Wiley
*Assistant Examiner*—David England

(57) ABSTRACT

A reliable multicast service is operated between a source device and multiple destination devices participating in a multicast group. The source device includes a first source application instance (AI) producing a first unit of work stream, and communication services (CS). Each destination device in the multicast group includes CS, and at least one destination AI which consumes units of work. Communication services/fabric provide communication between the source device and the multiple destination devices. Multiple source and destination resources (SDRs) implement corresponding multiple reliable transport services between the source device and corresponding multiple destination devices in the multicast group for delivery of the first unit of work stream to the corresponding destination devices and guaranteeing strong ordering of the first unit of work stream received at the corresponding destination devices.

51 Claims, 10 Drawing Sheets

U.S. PATENT DOCUMENTS

| | | | | |
|---|---|---|---|---|
| 6,006,254 | A | | 12/1999 | Waters et al. |
| 6,026,448 | A | | 2/2000 | Goldrian et al. ............ 709/712 |
| 6,047,323 | A | | 4/2000 | Krause ....................... 709/227 |
| 6,064,672 | A | * | 5/2000 | Van Loo et al. ............ 370/389 |
| 6,070,219 | A | | 5/2000 | McAlpine et al. .......... 710/263 |
| 6,088,736 | A | | 7/2000 | Manning et al. ............ 709/234 |
| 6,092,220 | A | | 7/2000 | Palmer et al. |
| 6,094,437 | A | * | 7/2000 | Loehndorf et al. ......... 370/420 |
| 6,119,163 | A | | 9/2000 | Monteiro et al. |
| 6,151,696 | A | * | 11/2000 | Miller et al. ................ 714/748 |
| 6,192,417 | B1 | * | 2/2001 | Block et al. ................ 709/249 |
| 6,205,150 | B1 | * | 3/2001 | Ruszczyk ................... 370/412 |
| 6,256,740 | B1 | * | 7/2001 | Muller et al. ............... 713/201 |
| 6,279,084 | B1 | * | 8/2001 | VanDoren et al. .......... 711/141 |
| 6,335,933 | B1 | * | 1/2002 | Mallory ...................... 370/394 |
| 6,392,993 | B1 | * | 5/2002 | Hamilton et al. ........... 370/230 |
| 6,738,821 | B1 | | 5/2004 | Wilson et al. |

OTHER PUBLICATIONS

PCT International Search Report mailed Aug. 21, 2000, for International Application No. PCT/US00/14382 (6 pages).

PCT International Search Report mailed Aug. 21, 2000, for International Application No. PCT/US00/14250 (6 pages).

PCT International Search Report mailed Aug. 22, 2000, for International Application No. PCT/US00/14282 (7 pages).

PCT International Search Report mailed Aug. 23, 2000, for International Application No. PCT/US00/14384 (6 pages).

PCT International Search Report mailed Aug. 25, 2000, for International Application No. PCT/US00/14294 (7 pages).

PCT International Search Report mailed Oct. 3, 2000, for International Application No. PCT/US00/14491 (7 pages).

PCT International Search Report mailed Oct. 30, 2000, for International Application No. PCT/US00/14226 (6 pages).

PCT International Search Report mailed Jan. 2, 2001, for International Application No. PCT/US00/14222 (6 pages).

Aguilar, Lorenzo, "Datagram Routing for Internet Multicasting," ACM, vol. 14, Issue 2, pp. 58-63 (Jun. 1984).

Aldrich, John M. et al., "How to Program a Set of Bits?" Google, Google Groups: comp.lang.c++, pp. 1-4 (Oct. 1997). <http://groups-beta.google.com>.

Armstrong, S. et al., "Multicast Transport Protocol," Network Working Group, Request for Comments: 1301, pp. 1-29 (Feb. 1992). <http://www.faqs.org/rfcs/rfc1301.html>.

Chang, Jo-Mei et al., "Reliable Broadcast Protocols," ACM Transactions on Computer Systems, vol. 2, No. 3, pp. 251-273 (Aug. 1984).

Cheriton, David R. et al., "Host Groups: A Multicast Extension for Datagram Internetworks," ACM, pp. 172-179 (1985).

Crowcroft, J. et al., "A Multicast Transport Protocol," ACM Press, pp. 247-256 (1988).

Diot, Christophe, "Reliability in Multicast Services and Protocols; A Survey," International Conference on Local and Metropolitan Communication Systems, 19 pages (Dec. 1994).

Fenner, W., "Internet Group Management Protocol, Ver. 2," Network Working Group, Request for Comments: 2236, pp. 1-18 (Nov. 1997). <http://www.faqs.org/rfcs/rfc2236.html>.

Information Sciences Institute, "Transmission Control Protocol," Darpa Internet Program Protocol Specification, pp. 1-68 (Sep. 1981). <http://www.faqs.org/rfcs/rfc793.html>.

Mockapetris, Paul V., "Analysis of Reliable Multicast Algorithms for Local Networks," ACM, pp. 150-157 (1983).

Paul, Sanjoy et al., "Reliable Multicast Transport Protocol (RMTP)," IEEE Journal on Selected Areas in Communications, vol. 15, No. 3, pp. 407-421 (Apr. 1997).

Rosenberg, Jerry M., "Dictionary of Computers, Information Processing, and Telecommunications," 2nd Edition, pp. 149, 150, and 155, (Aug. 1987).

Shay, William A., "Understanding Data Communications and Networks," PWS Publishing Company, Chapter 5, pp. 260-281 (1995).

* cited by examiner

RELIABLE MULTICAST

CROSS-REFERENCE TO RELATED APPLICATIONS

This Non-Provisional Utility Patent application is a Continuation-in-Part Application of U.S. Patent Application, filed May 23, 2000, entitled "RELIABLE DATAGRAM" which is herein incorporated by reference.

This Non-Provisional Utility Patent Application also claims the benefit of the filing date of U.S. Provisional Patent Application Ser. No. 60/135,664, filed May 24, 1999; and Ser. No. 60/154,150, filed Sep. 15, 1999 and both of which are herein incorporated by reference.

This Non-Provisional Utility Patent Application is also related to PCT Patent Applications filed on even date herewith, entitled "QUALITY OF SERVICE IN RELIABLE DATAGRAM" having PCT/US001/14226; "CONGESTION MANAGEMENT IN DISTRIBUTED COMPUTER SYSTEM" having PCT/US001/14294; "RELIABLE MULTI-UNICAST" having PCT/US00/14250; "MEMORY MANAGEMENT IN DISTRIBUTED COMPUTER SYSTEM" having PCT/US00/14282; "PARTITIONING IN DISTRIBUTED COMPUTER SYSTEM" having PCT/US00/14491; and "RELIABLE DATAGRAM TRANSPORT SERVICE" having PCT US00/14222, which are all herein incorporated by reference.

THE FIELD OF THE INVENTION

The present invention generally relates to data processing, and more particularly to a source application instance (AI) communicating with multiple destinations AIs via a reliable multicast service.

BACKGROUND OF THE INVENTION

In some conventional data processing systems, a source application instance (AI) can communicate with multiple destination AIs via an unreliable multicast service. An AI is herein defined to be a producer or a consumer of data in the data processing system. An AI can be implemented in software, hardware, or firmware, or in any combination of these. A unit of work is herein defined to be data which is transmitted between a source AI and a destination AI. Accordingly, a source AI is the producer of the unit of work sent to the destination AI. The destination AI is the consumer of the unit of work sent from the source AI.

A conventional unreliable multicast service is typically implemented by replicating a unit of work provided from the source AI with a replicater and transmitter component of an underlying communication services/fabric. For example, a switch or a router within the communication services/fabric is typically employed to replicate the unit of work provided from the source AI and to transmit the replicated unit of work to multiple destination AIs which are participating in a target multicast group. The conventional multicast service is designed as an unreliable transport service because of the functional and resource limitations of the traditional replicater and transmitter component. Thus, the conventional unreliable multicast service is only employed in applications which can tolerate unit of work loss, such as some types of multimedia applications. Applications which require reliability have to implement reliability features within the application itself because the reliability features are not implemented in the conventional multicast service.

For reasons stated above and for other reasons presented in greater detail in the Description of the Preferred Embodiments section of the present specification, there is a need for a reliable multicast service through which a source AI can reliably communicate with multiple destination AIs in data processing systems. The reliable multicast service should guarantee that the received order of units of work at each of the destination AIs in the multicast group is the same as the transmitted order of units of work from the source AI. In addition, the reliable multicast service should provide the same semantic behaviors as unreliable multicast services to permit existing applications employing conventional unreliable multicast services to employ the reliable multicast service without modifications to the existing application.

SUMMARY OF THE INVENTION

The present invention provides a data processing system including a source device and multiple destination devices participating in a multicast group. The source device includes a first source application instance (AI) producing a first unit of work stream, and communication services (CS). Each destination device in the multicast group includes CS, and at least one destination AI which consumes units of work. Communication services/fabric provide communication between the source device and the multiple destination devices. The data processing system includes multiple source and destination resources (SDRs). Each SDR implements a reliable transport service between the source device and a corresponding one of the multiple destination devices in the multicast group for delivery of the first unit of work stream at the corresponding destination device and guaranteeing strong ordering of the first unit of work stream received at the corresponding destination device.

In one embodiment, the CS in the source device verifies that a predetermined percentage of destination AIs in the multicast group reliably receives each unit in the first unit of work stream. In one embodiment, the predetermined percentage is 100% of the destination AIs, and in another embodiment the predetermined percentage is less than 100% of the destination AIs.

In one embodiment, the CS in the source device includes an acknowledgement counter which counts acknowledgements received from the corresponding destination devices in the multicast group indicating that the corresponding destination device has received a unit of work in the first unit of work stream. The CS in the source device generates a completion event when the acknowledgement counter indicates that all, or a predetermined percentage of, destination AIs in the multicast group have acknowledged the unit of work has been received.

In one embodiment, the CS in the source device includes a bit-mask array which assigns a unique bit for each destination AI in the multicast group and clears each bit as a corresponding acknowledgment is received from the corresponding destination device in the multicast group indicating that the corresponding destination device has received a unit of work in the first unit of work stream. The CS in the source device generates a completion event when the bit-mask array has the predetermined percentage of bits cleared in the bit-mask array indicating that all, or a predetermined percentage of, destination AIs in the multicast group have acknowledged that the unit of work has been received.

In one embodiment, the CS in the source device replicates the first unit of work stream for transmission to the destination AIs in the multicast group. In another embodiment, the communication services/fabric includes at least one replicater component, such as a switch or a router, for replicating the first unit of work stream for transmission to the destination AIs in the multicast group. In one embodiment, the CS in the source device includes a timing window. If the timing window expires without necessary conditions for a completion event occurring, then middleware AI or CS tracks and resolves missing acknowledgments.

In one embodiment the following example multicast operations are employed to implement the reliable multicast service. A given AI joins the multicast group by performing a multicast join operation. Middleware AI or CS determines whether the given AI can join the multicast group, validates access rights, and informs the devices participating in the multicast group of changes in the group. A given AI leaves the multicast group by performing a multicast leave operation, and middleware AI or CS informs the devices participating in the multicast group to remove the given AI from the destination list, to complete all in-flight units of work as though the given AI were still present, and to not target the given AI for units of work not yet launched. An AI, middleware AI, or CS performs a get attribute operation to query current attributes of the multicast group. An AI, middleware AI, or CS performs a set attribute operation to set multicast group attributes. A middleware AI performs a remove member operation to remove a given AI from the multicast group without involving the given AI.

In one embodiment, an agreed to multicast address is employed to address AIs in the multicast group. The CS in each device participating in the multicast group interprets the agreed to multicast address and responds to the agreed to multicast address to perform a reliable multicast operation on behalf of the corresponding destination AI.

In one embodiment, the reliable multicast operation has substantially the same semantic behavior relative to a given AI as an unreliable multicast operation.

In one embodiment, the multiple SDRs are grouped into multiple SDR groups. Each of the multiple SDR groups includes at least one SDR and is assigned a unique priority level for effecting throughput and response time of units of work transmitted by the at least one SDR.

In one embodiment, the source device also functions as a destination device and at least one of the destination devices also functions as a source device.

In one embodiment, each SDR includes source SDR resources at the source device and destination SDR resources at each corresponding destination device. The source SDR resources transmit the first unit of work stream in a serial unit of work stream having units of work in a defined order over the communication services/fabric. The destination SDR resources receive the serial unit of work stream and demultiplex the serial unit of work stream into units of work provided to the corresponding at least one destination AI.

In one embodiment, the destination SDR resources provide a negative acknowledgement (NAK) for a unit of work received ahead of its defined order. In one embodiment, the destination SDR resources drop a unit of work received ahead of its defined order. In one embodiment, the destination SDR resources provide a positive acknowledgement (ACK) for each unit of work which is successfully received and processed by the destination SDR resources. In one embodiment, the destination SDR resources provide a cumulative positive acknowledgement (ACK) for a set of units of work that indicate that all units of work in the set of units of work up to and including a current unit of work have been successfully received and processed by the destination SDR resources. In one embodiment, the destination SDR resources drop a unit of work in response to an indication that the unit of work is a duplicate unit of work.

The present invention also provides a method of processing data comprising including producing a first unit of work stream with a first source application instance (AI) at a source device participating in a multicast group. The first unit of work stream is reproduced. Multiple reliable transport services are established such that each reliable transport service is established between the source device and a corresponding one of multiple destination devices participating in the multicast group. Each destination device has at least one destination AI. The reproduced first unit of work stream is multicast over a communication services/fabric with the multiple reliable transport services. Strong ordering of the first unit of work stream received at the corresponding destination device is guaranteed.

The reliable multicast service according to the present invention permits applications to off-load the reliability function to the common set of CS. The off-loading of the reliability function from the application to the common set of CS permits multiple applications to benefit from sharing the CS. Applications not having to deal with the reliability concerns in the multicast operations have improved performance and quality due to the ability to optimize and leverage the quality across multiple applications. Furthermore, the complexity of a given application, the design steps to create and verify the given application, and the time-to-market for the given application are significantly reduced when the given application does not have to deal with the reliability of the multicast operations.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention is directed to a reliable multicast service in a data processing system. A source application instance (AI) can reliably communicate with multiple destination AIs via the reliable multicast service according to the present invention. The reliable multicast service according to the present invention is implemented with a source and destination resource (SDR) according to the present invention. The operation of the SDR is better understood by first describing a reliable datagram service implemented with a SDR.

Reliable Datagram Service

Figure 1:
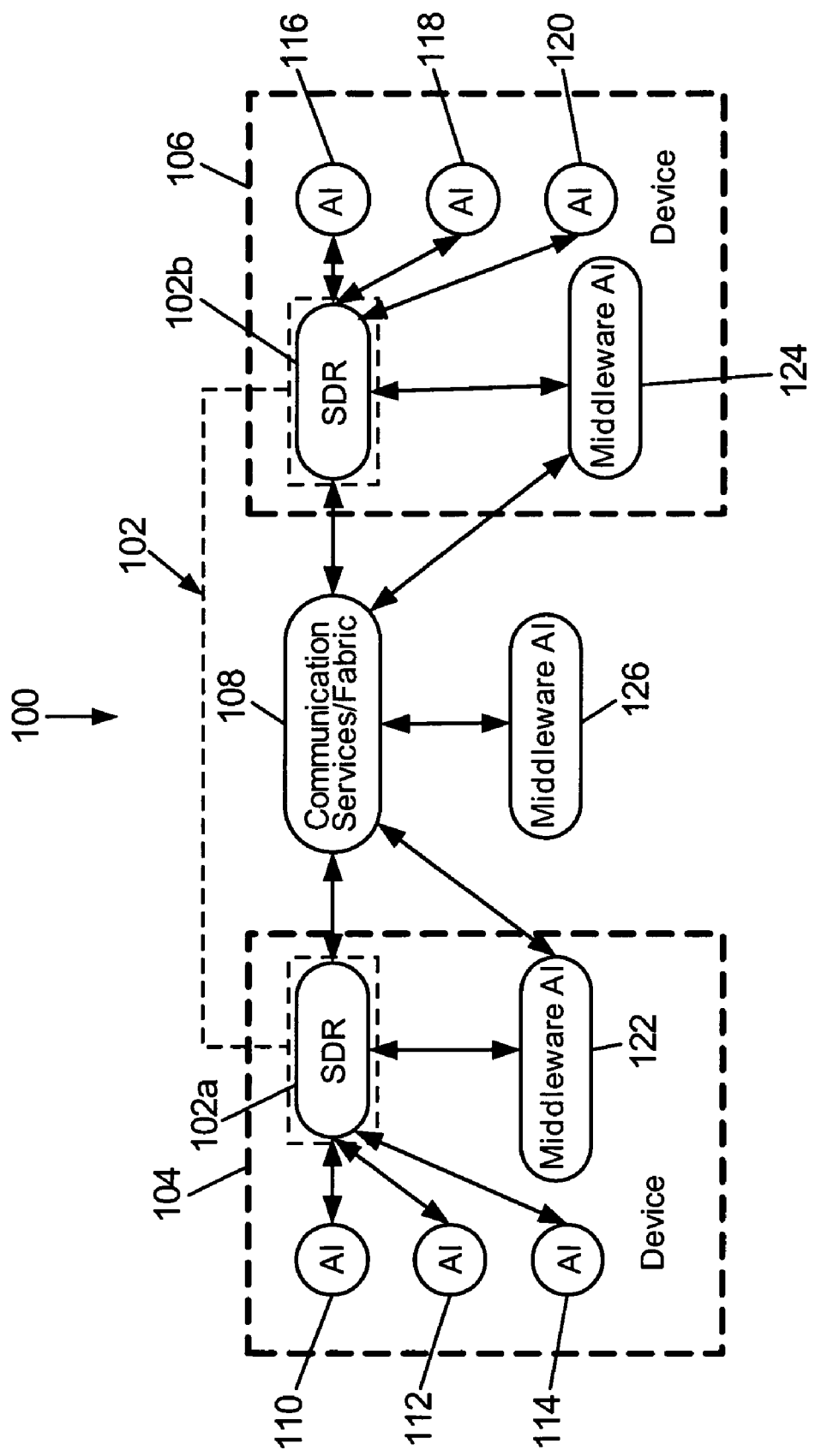
FIG. 1 is a diagram of a portion of a data processing system employing a reliable datagram service for providing reliable communication between distributed application instances.

A portion of a data processing system having a reliable datagram service for providing reliable communication between distributed AIs is illustrated generally at 100 in FIG. 1. The reliable datagram service illustrated in FIG. 1 also provides for a highly scalable data processing system 100.

Data processing system 100 includes a SDR 102 for implementing a reliable datagram service between a device 104 and a device 106. SDR 102 comprises SDR resources 102a at device 104 and SDR resources 102b at device 106. SDR resources 102a communicate with SDR resources 102b via a communication services/fabric 108. Device 104 and device 106 can each be a source or a destination device depending on the direction of communication. Device 104 includes an AI 110, an AI 112, and an AI 114. Device 106 includes an AI 116, an AI 118, and an AI 120. AIs produce or consume data. AIs can be implemented in software, hardware, or firmware, or in any combination of these.

A first step in implementing a reliable datagram service between source and destination devices, such as devices 104 and 106, is to create a SDR, such as SDR 102, upon which reliable communication can be implemented in a scalable data processing system. A variety of suitable techniques can be used to create a SDR. One such suitable technique employs an unreliable datagram service between middleware AIs on the source and destination devices, such as middleware AI 122 on device 104 and middleware AI 124 on device 106. The middleware AIs exchange sufficient data to uniquely identify the SDR which will be employed to exchange reliable datagrams. Middleware AIs facilitate communication between AIs either directly, such as by providing a communication application programming interface (API) and library, or indirectly, such as by providing transparent error recovery and other management services. Middleware AIs can be implemented in hardware via a state machine, in firmware, or in software within a given device, such as devices 104 and 106. One embodiment of a middleware AI (e.g., middleware AIs 122 and 124) operates local to the AIs within the same device. One embodiment of a middleware AI, such as middleware AI 126, executes remotely and is accessed via the underlying communication services/fabric.

Once a SDR is established, any number of source AIs can employ the established SDR, such as SDR 102, to communicate to any number of destination AIs, because the established SDR functions as a point of multiplexing at the source device and as a point of demulitplixing at the destination device.

In an example operation of SDR 102, device 104 is a source device and device 106 is a destination device. In this example operation, A's 110, 112, and 114 of source device 104 are source A's which produce units of work transmitted to the destination device 106. In this example operation, AIs 116, 118, and 120 are destination AIs which consume the units of work transmitted from corresponding source AIs 110, 112, and 114. In this example operation, SDR resources 102a at source device 104 multiplex units of work produced by source AIs 110, 112, and 114 into a serial unit of work stream provided on communication services/fabric 108. The serial unit of work stream is demultiplexed by SDR resources 102b at destination device 106 into units of work consumed by AIs 116, 118, and 120. In this example operation, SDR resources 102b validate the delivery of units of work, generate positive acknowledgements (ACKs) and negative acknowledgments (NAKs), and perform resynchronization operations based on any detected errors.

The reliable datagram service implemented with a SDR, such as SDR 102, provides for distributed AI communication using one-to-one, one-to-many, or many-to-one AI relationships. In addition, AIs can operate within the same device via a device backplane fabric (e.g., a form of shared memory within a device) or between disparate devices which are connected via an intermediate communication fabric. Therefore, the communications between AIs is independent of the physical locality of the AIs.

A unit of work is data transmitted between a source AI and a destination AI. In one embodiment, the units of work are treated as opaque objects by the underlying communication services/fabric. In one embodiment, however, the underlying communication services/fabric performs optional filtering services on the units of work based on the capability of the underlying communication services/fabric and the requirements of the middleware A's and AIs.

The reliable datagram service includes the following mechanisms to assure reliable transmission of the units of work between the source A's and the destination A's. A strong ordering mechanism in the SDR guarantees that the destination A's receive the units of work in the same order that the corresponding source AIs sent the unit of work. Units of work sent by other source AIs to the same destination AI using separate SDRs may be interleaved. Strong ordering is only guaranteed on a one-to-one source AI-to-destination AI resource basis.

A second mechanism for assuring reliable transmission of the units of work between the source AIs and the destination AIs is that a given unit of work is received by the destination SDR resources exactly once. In other words, duplicate copies of units of work which may be generated during an error event or a recovery operation are detected and not delivered to the destination AI.

A third mechanism for assuring reliable transmission of the units of work between the source AIs and the destination AIs is an acknowledgement mechanism. The source AI and/or the communication services/fabric are informed of a unit of work transmission completion either via a positive acknowledgement (ACK) which indicates a unit of work was successively transmitted and received or a negative acknowledgement (NAK) which indicates an unrecoverable error was detected either within the unit of work or in its transmission. In one embodiment, a source AI is notified of an error through out-of-band communication, such as an alarm generated by the underlying communication services/fabric when a hardware failure is detected.

In one embodiment, AIs use the same sender-based or receiver-based communication and memory management/protection techniques as traditionally used by reliable connections services. In addition, AIs can implement other reliable operations and additional reliable techniques utilizing reliable datagrams which are not normally implemented using reliable connections.

Logical unit of work transmission size is limited only by the size of the memory window exported (sender-based communication) or posted (receiver-based communication) by the destination AI. Receiver-based AIs can support one or multiple memory buffers as transmission targets. The receiver communication services/fabric are responsible for selecting the optimal memory buffer to target for a given unit of work based on unit of work attributes or AI input.

Memory is protected using techniques such as Hamlyn protection mechanisms to ensure correct access rights (e.g., no access, read access, write access, read/write access, memory address range verification, and the like) are verified before access is granted to an AI.

Figure 2:
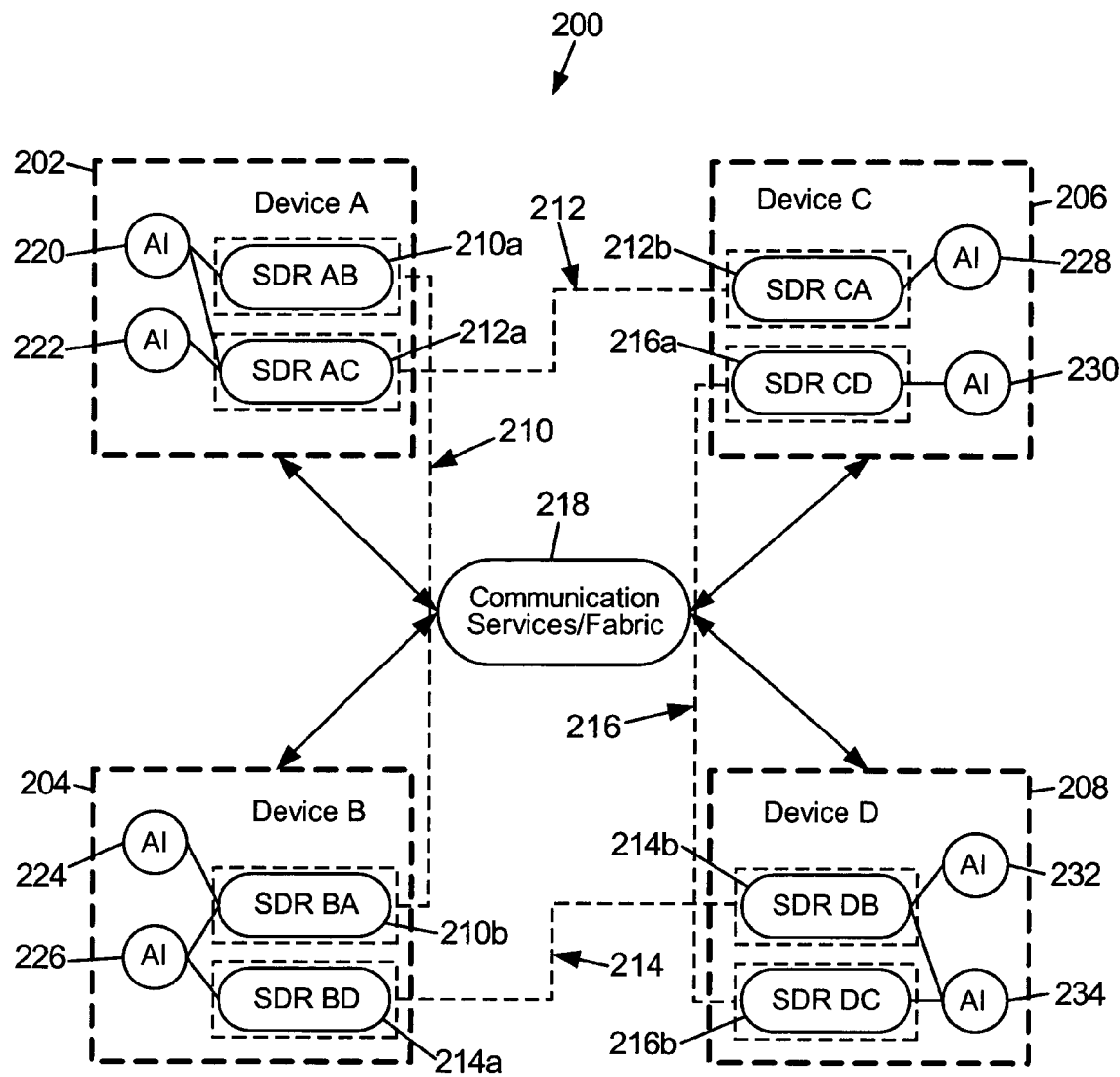
FIG. 2 is a diagram of a portion of a data processing system having multiple source and destination resources (SDRs) for implementing a reliable datagram service between multiple devices.

A portion of a data processing system having multiple SDRs is illustrated generally at 200 in FIG. 2. Data processing system 200 includes a device A indicated at 202, a device B indicated at 204, a device C indicated at 206, and a device D indicated at 208. A SDR 210 including SDR resources 210a at device 202 and SDR resources 210b at device 204 implements a reliable datagram service between device 202 and device 204. A SDR 212 including SDR resources 212a at device 202 and SDR resources 212b at device 206 implements a reliable datagram service between device 202 and 206. A SDR 214 including SDR resources 214a at device 204 and SDR resources 214b at device 208 implements a reliable datagram service between device 204 and 208. A SDR 216 including SDR resources 216a at device 206 and SDR resources 216b at device 208 implements a reliable datagram service between device 206 and device 208. The source and destination ends of each of the SDRs 210, 212, 214, and 216 communicate via a communication services/fabric 218. Devices 202, 204, 206, and 208 can each be a source or a destination device depending on the direction of communication.

Device 202 includes an AI 220 coupled to SDR resources 210a and SDR resources 212a; and an AI 222 coupled to SDR resources 212a. Device 204 includes an AI 224 coupled to SDR resources 210b; and an AI 226 coupled to SDR resources 210b and SDR resources 214a. Device 206 includes an AI 228 coupled to SDR resources 212b; and an AI 230 coupled to SDR resources 216a. Device 208 includes an AI 232 coupled to SDR resources 214b; and an AI 234 coupled to SDR resources 214b and SDR resources 216b.

Thus, for each <source, destination> device tuple, one or more SDRs are established (e.g., SDR 210 is established for the device 202—device 204 tuple). The AIs on each device can communicate to any AI on another device to which they are coupled through an associated SDR. One or more SDRs can be associated with a given physical fabric device allowing traffic segregation and multiple topologies to be supported.

Example Reliable Communication Protocol

The above-described strong ordering mechanism, the mechanism providing that a given unit of work is received by the destination SDR resources exactly once, and the acknowledge mechanism, which together assure reliable transmission of the units of work between the source AIs and the destination AIs, can be implemented according to the following example reliable communication protocol.

The example reliable communication protocol includes serializing all units of work which are transmitted between a source AI and a corresponding destination AI into a unit of work stream. The serialization of the units of work into a unit of stream is accomplished as follows. In one embodiment, each unit of work is treated as an opaque object which is encapsulated within a protocol header for transmission. A protocol header contains the fields employed by the underlying communication services/fabric to target the destination AI.

Figure 3:
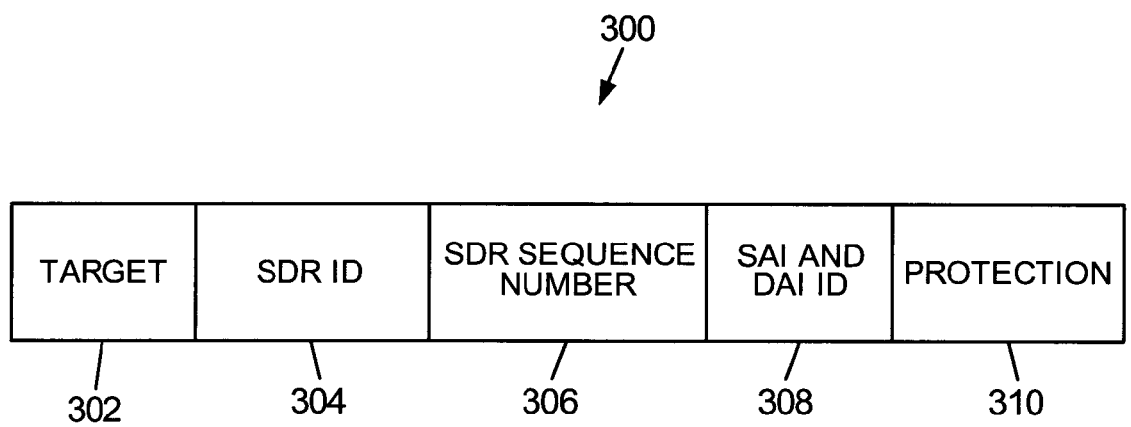
FIG. 3 is a diagram of one embodiment of a protocol header containing fields employed by an underlying communication services/fabric to target a destination application instance in a reliable datagram service.

One example embodiment of a protocol header is illustrated generally at 300 in FIG. 3. Protocol header 300 includes target fields 302 which are employed by the underlying communication services/fabric to target the destination AI. A SDR identifier field 304 uniquely identifies the SDR employed to send and receive the units of work. All communication requiring strong ordering must flow through the same SDR. Strong ordering is not guaranteed across SDRs within the same device.

A SDR sequence number field 306 provides a unique logical time stamp representing a defined order of the units of work in the unit of work stream transmitted from the source SDR resources and is employed by the destination SDR resources for verifying that units of work are arriving in order and for detecting if any units of work are missing. The successive protocol headers in a given serial unit of work stream contain monotonically increasing number values in their respective SDR sequence number fields, which are assigned per SDR.

If the SDR sequence number field 306 value matches the expected sequence number valve stored in the destination SDR resources, then other protocol header 300 fields are verified by the destination SDR resources. The destination SDR resources provide an ACK if the current unit of work is determined to be valid from the destination device's perspective. The destination SDR resources provide a NAK if the current unit of work is determined to be invalid from the destination device's perspective.

The SDR sequence number field 306 value being less than an expected next sequence number value stored in the destination SDR resources indicates that the unit of work is a duplicate unit of work and the unit of work is dropped by the destination SDR resources. In one embodiment, the duplicate unit of work is silently dropped by the destination SDR resources. In one embodiment, the destination SDR resources drop the duplicate unit of work and provide an ACK indicating to the source SDR resources that the last unit of work was received to avoid the source SDR resources from again transmitting the duplicate unit of work in case the previous ACK corresponding the firstly received unit of work with the same SDR sequence number was dropped.

The SDR sequence number field 306 value being greater than the expected next sequence number value stored in the destination SDR resources indicates that the current unit of work is received ahead of its defined order, and thus, an intermediate unit of work is missing. A first option for responding to the indication that an intermediate unit of work is missing is for the destination SDR resources to silently drop the current unit of work and await the source SDR resources to retransmit the missing unit of work based, for example, on a timer expiring.

A second option for responding to the indication that an intermediate unit of work is missing is for the destination SDR resources to provide a NAK, which contains the expected next sequence number value in the SDR sequence number field of the protocol header of the NAK, indicating to the source SDR resources that an intermediate of work is missing. In one embodiment implementing the second option, the unit of work is dropped and the NAK indicates to the source SDR resources the sequence number of the missing intermediate unit of work. The source SDR resources respond to the NAK and retransmit all units of work having an assigned SDR sequence number value equal to or greater than the SDR sequence number value corresponding to the missing intermediate unit of work.

In another embodiment implementing the second option for responding to the indication that an intermediate unit of work is missing, the destination SDR resources verify other protocol header fields. If all other verification checks pass, the destination SDR resources temporarily store the current unit of work, while the middleware A's perform a resynchronization operation to recover the missing intermediate unit of work.

Resynchronization is herein defined to be the process employed to synchronize the SDR associated with a given <source AI, destination AI> tuple. In other words, resynchronization aligns the SDR contents to determine what units of work have been posted for transmission, what units of work have been reliably completed, and what units of work need to be retransmitted. The resynchronization process is primarily controlled by the SDR sequence number values associated with a given SDR to retransmit and/or clean up the non-completed units of work. While resynchronization is performed strictly on an implementation dependent basis, the resynchronization process can also employ a barrier control message containing SDR state and control values, such as SDR sequence numbers and acknowledgment numbers, where the barrier control message is transmitted between the source and destination devices.

Error recovery for a given <source AI, destination AI> tuple typically involves performing a resynchronization event between the resources associated with the source AI and the destination AI. The resources associated with the source AI and the destination AI contain sufficient state information to recover all operations which have not been completed (i.e., neither an ACK nor a NAK has been received by the source AI to complete the unit of work transmission). The resource and the unit of work state information can be maintained at any location within the source and destination devices.

The example protocol header 300 illustrated in FIG. 3 also includes source AI and destination AI identifier fields 308. The source AI and destination identifier fields 308 are employed to perform completion events, identify the source AI to the destination AI for subsequent application-specific exchanges, and the like.

If the AIs are employing sender-based communication, example protocol header 300 contains additional protection fields 310. Example protection fields 310 includes Hamlyn-style protection key, memory buffer address and offsets, and the like. Protection fields 310 are validated by the destination SDR resources before memory access is granted.

According to the example reliable communication protocol, each unit of work must be acknowledged using either an ACK, a NAK, or a communication services/fabric error notification. Acknowledgments are used to indicate whether a unit of work has reached the destination SDR resources and some form of action has been performed in response thereto.

In one embodiment, the acknowledgments (e.g., ACK, NAK, and communication services/fabric error notification) are implemented as stand-alone unit of work exchanges which are separate and well defined. In one embodiment, the acknowledgments are encapsulated in the unit of work within a protocol header. In one embodiment, the acknowledgments are formed as a component within a protocol header which is either transmitted separately or piggy-backed within another unit of work being transmitted in the other direction.

In one embodiment, ACKs are on a per unit of work basis. In this embodiment, a separate ACK is transmitted for each unit of work which is successfully received and processed by the destination SDR resources. In another embodiment, the ACKs are cumulative. In the cumulative ACK embodiment, for a given set of units of work, a single ACK is transmitted with the embedded SDR sequence number indicating that all units of work in the set of units of work up to and including the unit of work assigned the current SDR sequence number have been successfully received and processed by the destination SDR resources. An AI can have multiple units of work in-flight at any given time depending upon the underlying communication services/fabrics capabilities. The number of units of work that a given AI can have in-flight at a given time is not limited by the possible scope of the reliable datagram service, but can possibly be limited by specific implementation details of the SDRs and the underlying communication services/fabric capabilities.

In one embodiment, NAKs are generated on a per unit of work basis for each unit of work which is incorrectly received at the destination SDR resources. Example reasons for a unit of work to be incorrectly received at the destination SDR resources include cyclic redundancy check (CRC) error, protection violation, resource shortage, unrecognized destination AI, and the like. For each unit of work which is incorrectly received, a NAK is transmitted from the destination SDR resources and the NAK includes appropriate information to allow the source AI or the underlying communication services/fabric to determine the recovery action to perform in response to the NAK. If the NAK does not require a resynchronization event, the NAK serves as an acknowledgment for the unit of work to allow subsequent units of work flowing through the same destination SDR resources to be processed as through no error had occurred.

Acknowledgments (e.g., ACK, NAK, and communication services/fabric error notification) act as synchronization events between the source and destination ends of a SDR coupling the two devices of a <source, destination> device tuple to ensure that all units of work transmitted from the source device, independent of the AIs involved, are reliably delivered to the destination device.

In one embodiment, acknowledgments also act as acknowledgments at the AI level, allowing a source AI to be assured that the units of work transmitted from the source AI are reliably delivered to a corresponding destination AI. In this embodiment, unit of work retirement is automatically processed based on ACKs.

Thus, there is a distinction between units of work delivered to a destination device and units of work delivered to a destination AI on the destination device. Delivery location and acknowledgement semantics determines what responding action the source AI should perform. For example, if a unit of work is delivered to the destination device but not to the destination AI, the source AI cannot assume that the unit of work has actually been consumed by the destination AI, and thus, the source AI must be careful as to whether subsequent actions should be performed.

An illustrative example is as follows, if a source AI is moving a disk block from a first device to a first destination AI on a second device and then transferring ownership of the disk block to a second destination AI on a third device, the source AI needs to be assured that the disk block was actually received by the first destination AI and was acted upon by the first destination AI before the source AI transfers ownership to the second destination AI. If the disk block was not actually received by the first destination AI or was not acted upon by the first destination AI before the source AI transfers ownership to the second destination AI, a subsequent failure within the first destination AI could result in the second destination AI disk block owner reading stale data.

Example Transmission Operations

Figure 4:
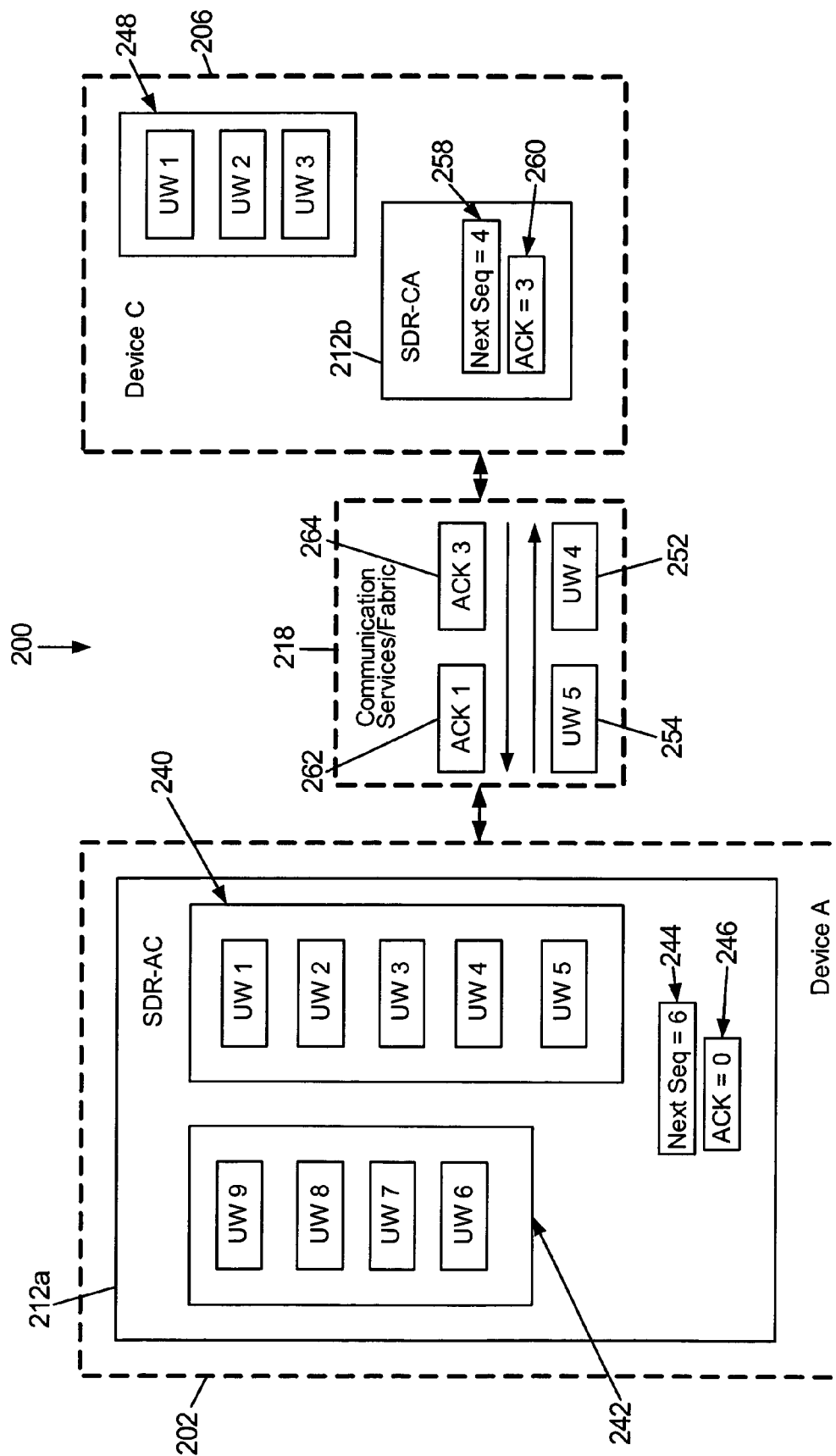
FIG. 4 is a diagram illustrating an example transmission operation between a source device and a destination device for the data processing system of FIG. 2.

An example transmission operation between source device A indicated at 202 and destination device C indicated at 206 for data processing system 200 is illustrated in diagram form in FIG. 4. As indicated in FIG. 4, SDR resources 212a at source device 202 include a queue 240 holding transmitted but not ACKed units of work and a queue 242 holding units of work not yet transmitted. At the time indicated in FIG. 4, queue 240 includes the following units of work: UW1; UW2; UW3; UW4; and UW5. The units of work held in queue 240 have been processed and transmitted by SDR resources 212a of source device 202. At the time indicated in FIG. 4, queue 242 includes the following units of work: UW6; UW7; UW8; and UW9. SDR resources 212a also store an expected next sequence number value 244 which is equal to 6 at the time indicated in FIG. 4. SDR resources 212a also store an ACK value 246, which is equal to 0 at the time indicated in FIG. 4.

As illustrated in FIG. 4, destination device C indicated at 206 includes a queue 248 holding received units of work. The received units of work held in queue 248 at the time illustrated in FIG. 4 include: UW1; UW2; and UW3. As indicated respectively at 252 and 254, the units of work UW4 and UW5, which have been transmitted from SDR resources 212a, are on the communication services/fabric 218 at the time indicated in FIG. 4. At the time indicated in FIG. 4, SDR resources 212b include an expected next sequence number value 258 which is equal to 4 and an ACK value 260 which is equal to 3. SDR resources 212b have transmitted a stand alone ACK, indicated at 262, for the received unit of work UW1 and a cumulative ACK, indicated at 264, for the received units of work UW2 and UW3. Again, the decision to transmit ACKs as stand alone ACKs or cumulative ACKs is implementation dependent. In one embodiment, a piggy-back ACK on a unit of work flowing from destination device 206 to source device 202 can be employed to carry the ACK back to source device 202. As units of work are transmitted, source device 202 and destination device 206 track what units of work have been acknowledged via ACK value 246 for device 202 and ACK value 260 for device 206. As units of work are transmitted, devices 202 and 206 via SDRs 212a and 212b also track the expected next sequence numbers via expected next sequence number value 244 for device 202 and expected next sequence number value 258 for device 206 to ensure reliability is maintained.

Figure 5:
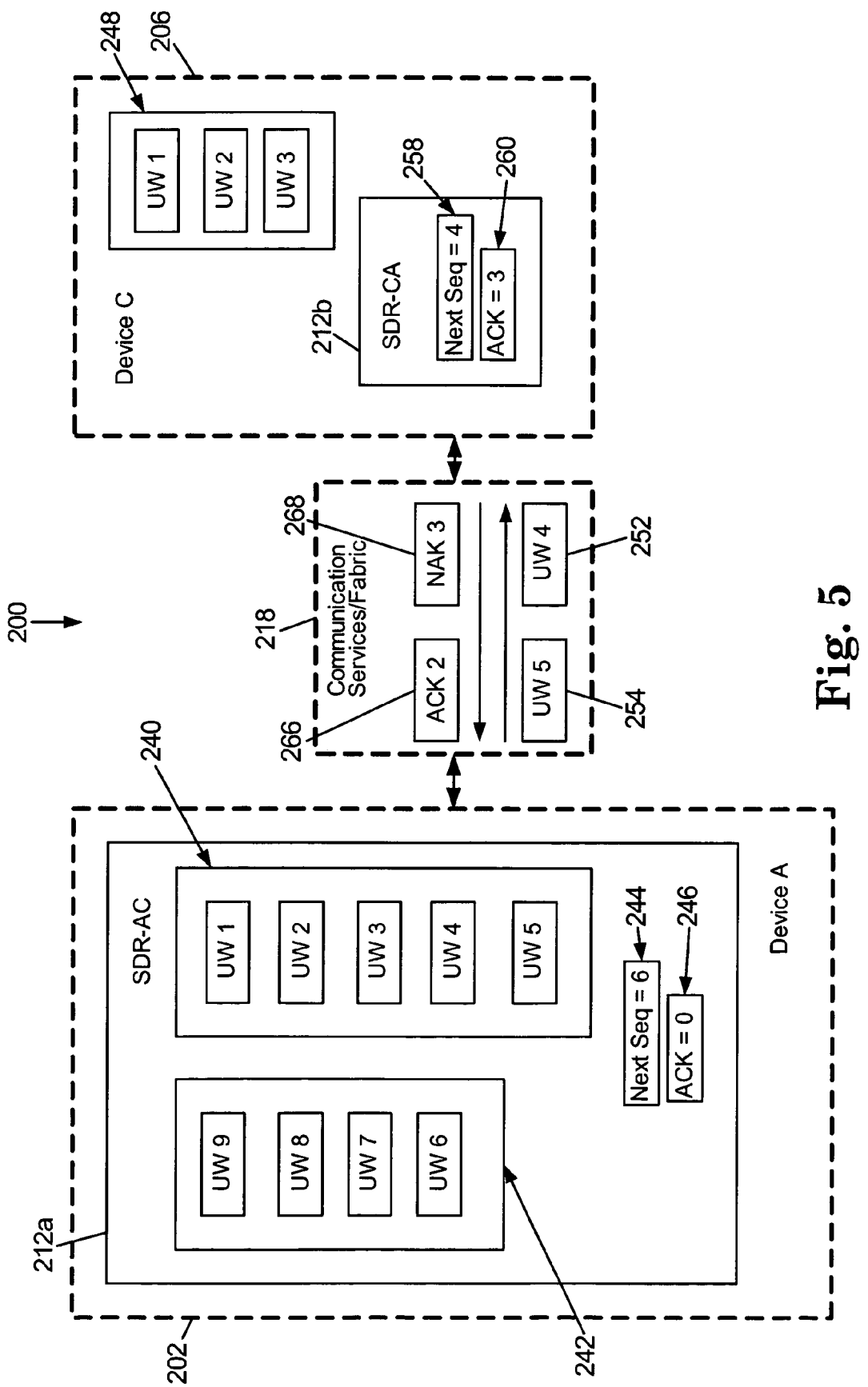
FIG. 5 is a diagram illustrating another example transmission operation between a source device and a destination device for the data processing system of FIG. 2.

Another example transmission operation between source device A indicated at 202 and destination device C indicated at to 206 for data processing system 200 is illustrated in diagram form in FIG. 5. In the transmission operation of FIG. 5, the state of SDR resources 212a of device 202 are substantially similar to the state of SDR resources 212a in the transmission operation of FIG. 4. Thus at the time indicated in FIG. 5, queue 240 of device 202 includes: UW1; UW2; UW3; UW4; and UW5. Queue 242 includes UW6; UW7; UW8; and UW9. The expected next sequence number value 244 is equal to 6 and the ACK value 246 is equal to 0. In addition at the time indicated in FIG. 5, device 206 has received UW1, UW2, and UW3 into queue 248. Also similar to the transmission operation illustrated in FIG. 4, SDR resources 212b include the expected next sequence number value 258 equal to 4 and the ACK value 260 equal to 3. Additionally, UW4 and UW5 are on the communication services/fabric 218 as indicated at 252 and 254 respectively.

However, in the transmission operation of FIG. 5, SDR resources 212b of device 206 have issued a cumulative ACK for UW1 and UW2, as indicated at 266. In addition, SDR resources 212b of device 206 have issued a NAK for UW3, as indicated at 268. In one embodiment, the NAK for UW3 indicated at 268 also contains an error code to indicate the type of error detected to facilitate the resynchronization process. For example, if a CRC error is detected, UW3 can be transparently retransmitted without involving the source AI. If, however, the detected error is that the destination AI is not operational, the source AI needs to be informed that UW3 and any other units of work which target the destination AI have failed. Once the source AI has been informed that UW3 and any other units of work which target the destination AI have failed, the source AI determines the necessary recovery technique to be used. For such a non-operational destination AI error, devices 202 and 206 increment the ACK value indicated respectively at 246 and 260 and the expected next sequence number value respectively indicated at 244 and 258, because a resynchronization operation is not required and subsequent units of work in-flight or to be transmitted can be processed as though the error did not occur assuming that the units of work target different destination AIs.

Figure 6:
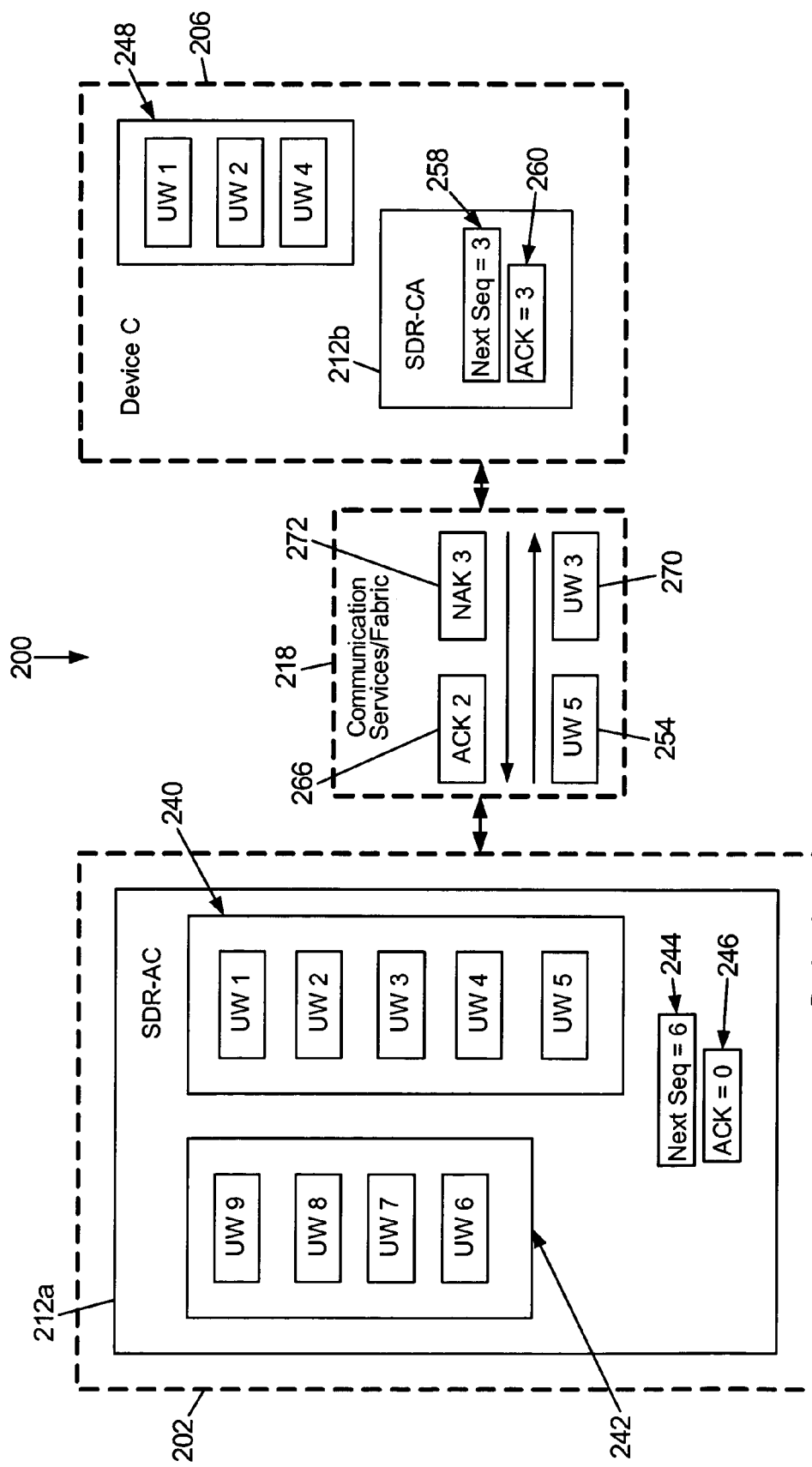
FIG. 6 is a diagram illustrating another example transmission operation between a source device and a destination device for the data processing system of FIG. 2.

Another example transmission operation between source device A indicated at 202 and destination device C indicated at 206 for data processing system 200 is illustrated in diagram form in FIG. 6. The example transmission operation of FIG. 6 illustrates that the reliable datagram service guarantees strong ordering of the received units of work at destination device 206 when the units of work flow through the same SDR (e.g., SDR 212).

In the transmission operation of FIG. 6, the state of SDR resources 212a of device 202 are substantially similar to the state of SDR resources 212a in the transmission operations of FIGS. 4 and 5. Thus, at the time indicated in FIG. 6, queue 240 of device 202 includes: UW1; UW2; UW3; UW4; and UW5. Queue 242 includes UW6; UW7; UW8; and UW9. The expected next sequence number value 244 is equal to 6 and the ACK value 246 is equal to 0.

However, in the example transmission operation of FIG. 6, the expected next sequence number value 258 of SDR resources 212b of destination device 206 is equal to 3 indicating that SDR resources 212b are expecting UW3 as the next unit of work in the serial unit of work stream from SDR resources 212a of source device 202. However, queue 248 of device 206 has received UW1, UW2, and UW4. In addition, as indicated at 270, UW3 is still on the communication services/fabric 218 behind the already received UW4 and just ahead of UW5, indicated at 254, in the serial unit of work stream from SDR resources 212a of source device 202. Although the transmission operation of FIG. 6 has UW3 out of its defined order in the unit of work stream by one unit of work position to more clearly illustrate a strong ordering violation, typically a strong ordering violation occurs when a unit of work is completely missing from the unit of work stream. SDR resources 212b have issued a cumulative ACK for UW1 and UW2 as indicated at 266. SDR resources 212b have also issued a NAK for UW3, as indicated at 272, which indicates a sequence number violation (i.e., a strong ordering protocol violation). In this example, the SDR sequence number of the protocol header of UW4 is equal to 4 which is larger than the expected next sequence number value 258, which is equal to 3. This strong ordering protocol violation in this example transmission operation indicates that UW3 is missing. Thus, SDRs 212a and 212b are resynchronized as the result of the NAK of UW3 indicated at 272.

Error Detection and Processing

Error detection and processing with the reliable datagram service is a function of the underlying communication services/fabric and the type of communication (e.g., sender-based or receiver-based communication) being employed. The underlying communication services/fabric and the type of communication being employed each provide error detection services which are generally independent of whether a given data processing system employs a reliable datagram service to communicate. Therefore, the following description is restricted to a description of the detection and processing of the type of errors which directly impact the reliable datagram service operation.

A first type of error which directly impacts the reliable datagram service operation is a protocol violation. A first type of protocol violation is a protection related violation. Examples of protection violations include: the unit of work protocol header containing invalid protection keys; invalid access right request (e.g., the request is to write to memory window but the destination AI has designated the memory window as read-only); memory address and bounds check violation; and the like. The protection errors are detected and a NAK is generated indicating the protection error so that the source AI can take appropriate corrective actions. The NAK in response to the protection error acts as a SDR acknowledgment and does not require a resynchronization event to be initialized.

A second type of protocol violation error is a sequence number error. A sequence number error occurs when the SDR sequence number field of the protocol header is either smaller or larger than the expected sequence number of the destination SDR resources. The SDR sequence number field value being less than the expected next sequence number value stored in the destination SDR resources indicates that the unit of work is a duplicate unit of work. The SDR sequence number field value being greater than the expected SDR sequence number value stored in the destination SDR resources indicates that the current unit of work is received ahead of its defined order, and thus, an intermediate unit of work corresponding to the expected next sequence number value is missing.

In one implementation, the sequence number check is actually a valid sequence number window check. In this implementation, sequence numbers are implemented using a fixed range (e.g., a 32-bit range yields 4 billion values). Within this range, a valid window is used to determine whether a unit of work is valid or not valid. This is a sliding window to account for the eventual sequence number roll-over. In one embodiment, sequence number check is implemented as representing half of the entire range (e.g., 2 billion if using a 32-bit sequence number). If the unit of work is within this range and less than what is expected, then it is a duplicate. If it is greater than the value, then either it is outside the window or it indicates that an intermediate unit of work was lost within the fabric. This will result in the unit of work being dropped, silently accepted but not completed, or a NAK can be generated indicating unit of work was dropped. Thus, in this implementation, the sequence number validation is a window validation check and the window is a sliding window.

The SDRs are resynchronized as a result of a sequence number error. In one embodiment, if the unit of work is determined to be a duplicate, the unit of work is silently dropped by the destination SDR resources. In one embodiment, the destination SDR resources drop the duplicate unit of work and provide an ACK indicating to the source SDR resources that the last unit of work was received to avoid the source SDR resources from again transmitting the duplicate unit of work in case the previous ACK corresponding the firstly received unit of work with the same SDR sequence number was dropped.

If the current unit of work is received ahead of its defined order indicating that an intermediate unit of work is missing as a result of the SDR sequence number field value being greater than the expected SDR sequence number, the destination SDR resources can take one of several actions. In one embodiment, the destination SDR resources silently drop the unit of work and await the source SDR resources to retransmit the missing unit of work based, for example, on a timer expiring. In one embodiment, the destination SDR resources generate a NAK in response to the indication that the unit of work is received ahead of its defined order and optionally drop the unit of work or temporarily store the unit of work into a received but unacknowledged queue. The NAK generated by the destination SDR resources informs the source SDR resources of the sequence number error and the expected next sequence number value. In one embodiment, the source SDR resources selectively retransmit unacknowledged units of work in response to the NAK indicating that a unit of work was received ahead of its defined order. In one embodiment, the source SDR resources retransmit all unacknowledged units of work in response to the NAK indicating that a unit of work was received ahead of its defined order.

Another type of error that directly impacts the reliable datagram service operation is the receipt of a corrupt unit of work. In this type of error, the unit of work or the attached protocol header is corrupted, such as by a CRC violation. In some situations, the destination device is not capable of trusting any portion of the unit of work when the receipt of a corrupt unit of work error occurs. In these situations, the destination device drops the unit of work and generates a NAK indicating the unit of work was corrupted. The next expected sequence number is included in the NAK so that the source device can determine which units of work are possibly lost and retransmit the unacknowledged units of work. The SDRs are resynchronized as a result of the receipt of a corrupt unit of work error.

Another type of error that directly impacts the reliable datagram service operation is a source AI or a destination AI abort error. No matter where the source AI or destination AI abort error occurs, the units of work which are in-flight either need to be flushed or completed so that all resources can be recovered. In one embodiment, if the source AI is aborted, the source device invalidates the unacknowledged units of work, employs a small control structure to account for all in-flight units of work so that the units of work can be completed even though the units of work are no longer valid, and shuts down communications. The source AI and destination AI abort error does not require a resynchronization event, and the flush operation is treated as a series of acknowledgements to insure all units of work on both sides of the <source, destination> device tuple have been acknowledged and all resources have been recovered.

Another type of error that directly impacts the reliable datagram service operation is the invalid destination AI error. The invalid destination AI error occurs when a source AI sends a unit of work to a destination AI which never was valid or is no longer valid. The destination device generates a NAK indicating the invalid DAI error for each unit of work targeting the invalid destination AI. The source device completes the units of work as normal and no resynchronization event is required with the invalid destination AI error.

Quality of Service

In one embodiment, quality of service (QoS) is implemented with the reliable datagram service by segregating the source AI traffic across a set of replicated SDRs. QoS relates to the scheduling of resources and AIs via service policies. QoS also relates to the employment of the service policies to effect the throughput and response times of a given AI unit of work stream.

Each SDR coupled between a <source, destination> tuple can be scheduled independently by the source device, the destination device, and the underlying communication services/fabric. This type of independent scheduling allows an application independent QoS policy to be implemented by middleware AIs. In one embodiment, each SDR is assigned a unique QoS. In one embodiment, SDRs are grouped into QoS levels where each QoS level is assigned a unique QoS.

Replicating SDRs creates the following generalized application benefits. First, AI communication resource contention is reduced because the communication resource contention can be spread across the multiple SDRs. Secondly, the number of AIs impacted by a given AI's behavior is reduced. As an illustrative example, strong ordering is preserved, in part, because a given unit of work transmission must be completed before subsequent unit of work transmissions can be acknowledged and completed. Therefore, if two source AIs are sharing the same SDR, the order that the source AIs issue requests is maintained by the SDR.

A third benefit to replicating SDRs is that when an error occurs, only the AIs employing the impacted SDR(s) are effected. Thus, all other AIs can continue to operate depending upon the error type. Transient errors, such as a CRC error, are recoverable. Hard errors, such as an error occurring because a physical link between AIs has failed, are recoverable if an alternative path physical link exists between the AIs and sufficient state information is available to successfully perform the replacement of the failed physical link with the alternative path physical link.

Figure 7:
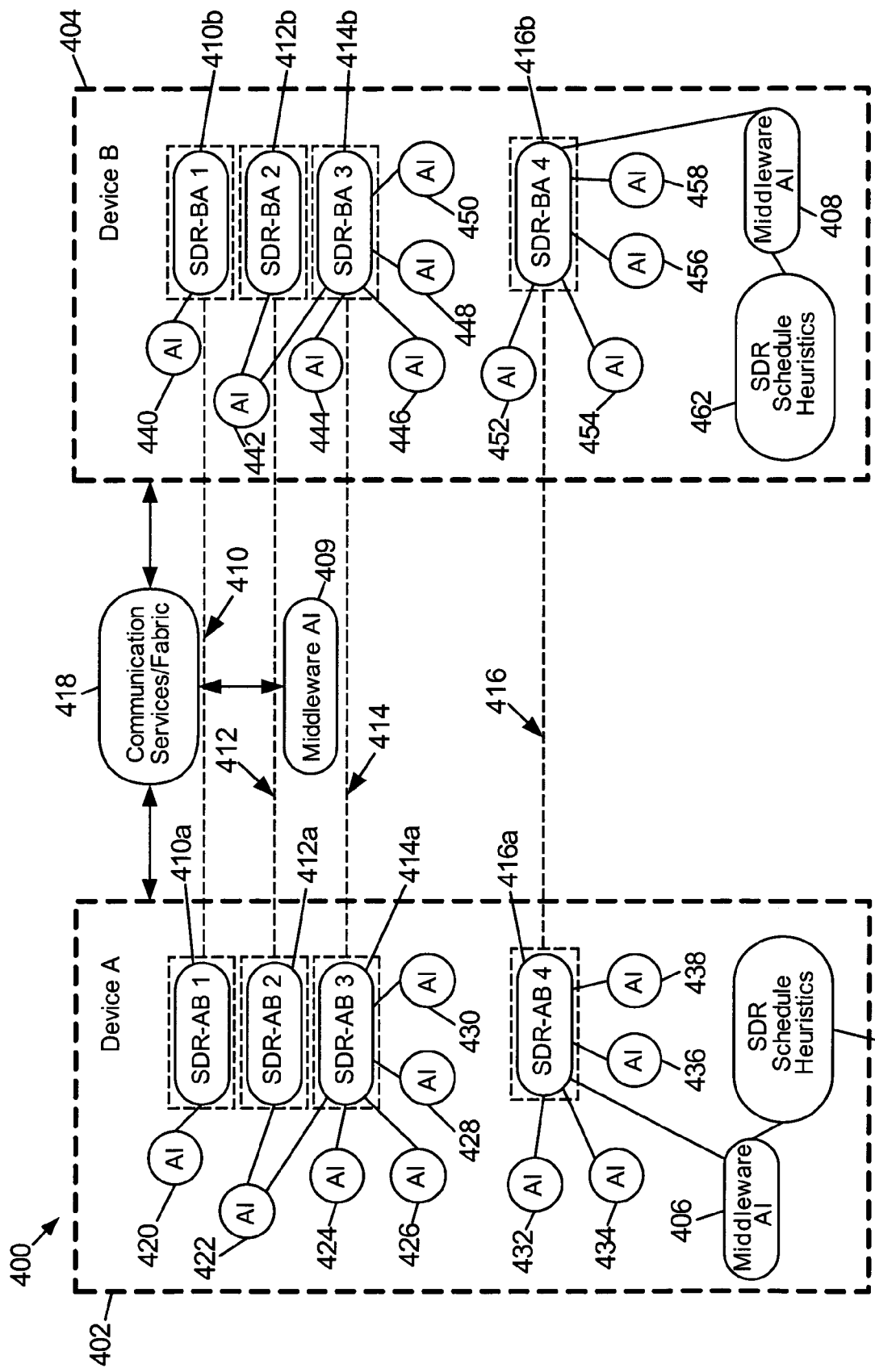
FIG. 7 is a diagram of a portion of a data processing system having multiple SDRs established between device pairs.

A portion of a data processing system having multiple SDRs established between device pairs is illustrated generally at 400 in FIG. 7. Data processing system 400 includes a reliable datagram service which has improved application performance and scalability because middleware AIs in data processing system 400 establish multiple SDRs between a device A indicated at 402 and a device B indicated at 404. An example middleware AI for device 402 is indicated at 406. An example middleware AI for device 404 is indicated at 408.

A SDR 410 including SDR resources 410a at device 402 and SDR resources 410b at device 404 implements a reliable datagram service between device 402 and device 404. A SDR 412 including SDR resources 412a at device 402 and SDR resources 412b at device 404 implements a reliable datagram service between device 402 and device 404. A SDR 414 including SDR resources 414a at device 402 and SDR resources 414b at device 404 implements a reliable datagram service between device 402 and device 404. A SDR 416 including SDR resources 416a at device 402 and SDR resources 416b at device 404 implements a reliable datagram service between device 402 and device 404. The source and destination ends of each of the SDRs 410, 412, 414, and 416 communicate via a communication services/fabric 418. Device 402 and device 404 can each be a source or a destination device depending on the direction of communication.

Thus, device A indicated at 402 and device B indicated at 404 communicate together via reliable datagram service provided by four established SDRs 410, 412, 414 and 416. The example configuration illustrated in FIG. 7 is for illustrative purposes only and similar configurations can be established between an arbitrary number of devices. As illustrated in FIG. 7, a set of AIs are bound to each SDR restricting the impact any AI has on another AI to generally only occur if the AIs share the same SDR.

In the example embodiment illustrated in FIG. 7, device 402 includes an AI 420 coupled to SDR resources 410a; and AI 422 coupled to SDR resources 412a and SDR resources 414a; AIs 424, 426, 428, and 430 each coupled to SDR resources 414a; and AIs 432, 434, 436, and 438 each coupled to SDR resources 416a. Device 404 includes an AI 440 coupled to SDR resources 410b; an AI 442 coupled to SDR resources 412b and SDR resources 414b; AIs 444, 446, 448, and 450 each coupled to SDR resources 414b; and AIs 452, 454, 456, and 458 each coupled to SDR resources 416b.

SDR resources 410a, 412a, 414a, and 416a are serviced based on the scheduling heuristics maintained at SDR schedule heuristics 460 in device 402. Similarly, SDR resources 410b, 412b, 414b, and 416b are serviced based on the scheduling heuristics maintained at SDR schedule heuristics 462 in device 404. In this way, SDR schedule heuristics are used to adjust the scheduling rate to create different QoS for the AIs bound to the SDRs.

In the embodiment illustrated in FIG. 7, AI 420 and AI 440 are exclusively assigned to SDR 410. When and if two AIs, such as AIs 420 and 440, are exclusively assigned to one SDR is determined by: a middleware AI local to a device, such as middleware AI 406 of device 402 and middleware AI 408 of device 404; a middleware AI executing remotely and acting as a central manager, such as middleware AI 409, which is accessed via the underlining communication services/fabric 418; and/or an application policy heuristics, such as stored at SDR schedule heuristics 460 of device 402 and SDR schedule heuristics 462 of device 404. Normally, such a decision is based on the application or device service level objectives.

A given AI, such as AI 422 and AI 442, can be bound to multiple SDRs if the given AI establishes multiple reliable datagram endpoints to communicate through. In such a case, each endpoint is serviced based on SDR scheduling heuristics, such as stored at SDR schedule heuristics 460 in device 402 and at SDR schedule heuristics 462 in device 404.

Establishing multiple SDRs between any two devices in data processing system 400 over which multiple AIs may operate provides the following benefits. Since each SDR is generally mutually independent from other SDRs, the behavior of the AIs bound to one SDR does not generally impact the behavior of AIs bound to another SDR. For example, an AI which processes large units of work can be bound to a different SDR so that it does not impact the performance of an AI which processes small units of work.

Another benefit of establishing multiple SDRs between two devices in data processing system 400 is that errors which occur on one SDR generally do not impact the behavior of AIs bound to another SDR. In addition, error recovery may be shorter or simplified depending upon the number of SDRs between any two devices and the type of error detected (e.g., transient, protocol, communication services failure, and the like).

Another benefit of establishing multiple SDRs between two devices in data processing system 400 is that a middleware AI, such as middleware AI 406 of device 402, may modify the SDR scheduling heuristics, such as SDR schedule heuristics 460 of device 402, to transparently adjust the service rate a given AI receives relative to other AIs. For example, an AI which is primarily processing high priority units of work can be bound to a SDR which is scheduled ahead of SDRs which are processing lower priority units of work. This modification of the SDR scheduling heuristics permits the middleware AI to create QoS policies based on the service level objectives associated with a given AI.

Another benefit of establishing multiple SDRs between two devices in data processing system 400 is that within a given priority band, multiple AIs may be segregated across multiple SDRs, with the SDRs within the priority band being serviced using simple scheduling policies, such as round-robin or weighted round-robin. The objective of the priority band being serviced using the simple scheduling policies is to reduce the potential contention on a given SDR to further limit the number of AIs impacted by a given AI's behavior when the SDR is shared among multiple AIs. The priority band being serviced using these simple scheduling policies improves AI scalability and overall performance of the applications. However, any type of arbitrary scheduling policies can be created for QoS.

In the reliable datagram service, striping refers to the technique of transmitting units of work over multiple SDRs from one source AI to one destination AI. If strong ordering is required when transmitting units of work from a source AI to a destination AI, the source AI needs to transmit the units of work on one SDR. But if weak ordering is possible when transmitting units of work from a source AI to a destination AI, the source AI can transmit the units of work on multiple SDRs (i.e., the source AI can employ striping) with some priority scheme, but with the potential that strong ordering is not maintained. For example, most multi-media applications can be transmitted with striping so that resolution at the receiving end improves over time, but without the pixels arriving in a strongly ordered manner.

As to establishing multiple SDRs for a given device pair, the reliable datagram service provides no limit on the number of SDRs which can be established between the given device pair. There are, however, practical design considerations to limit the number of SDRs established between a given device pair. For example, each added SDR includes corresponding added physical resources. Moreover, additional resources are required to schedule the unit of work traffic between the given device pair across multiple SDRs and the scheduling becomes more complex as the number of SDRs are increased. In addition, the number of priority levels assigned to the multiple SDRs is preferably kept at a practical design number. Thus, the number of the SDRs to establish between a given device pair and the priority levels to be assigned to the multiple SDRs is limited only by implementation design considerations.

Advantages of Reliable Datagram Service

AIs employing a reliable connection service must create one dedicated resource set per destination AI. By contrast, AIs employing the above-described reliable datagram service can re-use the same resource set per multiple destination AIs. Thus, the reliable datagram service reduces the number of resource sets to create and manage which accordingly reduces AI implementation cost and design complexity. In this way, the reliable datagram service provides for highly scalable data processing systems.

Even though the reliable datagram service provides for highly scalable data processing systems, the reliable datagram service provides reliable communication between AIs including guaranteed ordering of units of work transmitted between AIs. The reliable datagram service provides the reliability of a reliable connection service by guaranteeing that the unit of work transmission is reliable so that AIs employing the reliable datagram service can rely on the underlying communication services/fabric to correctly deliver the units of work or on error notification in the event of an unrecoverable error. In this way, the reliable datagram service permits an AI to effectively off-load unit of work delivery to the reliable datagram service which reduces AI development costs.

Moreover, in one embodiment of a data processing system, unreliable datagram service is simultaneously supported on a communication services/fabric which supports reliable datagram service. In one embodiment, unreliable datagram service is simultaneously supported along with reliable datagram service by tagging a unit of work as unreliable and avoiding acknowledgment/error processing actions. In one embodiment, an unreliable datagram service is simultaneously supported along with a reliable datagram service by treating all data as reliable, and as a result, never entering an application unit of work recovery algorithm.

Reliable Multicast Service

Figure 8:
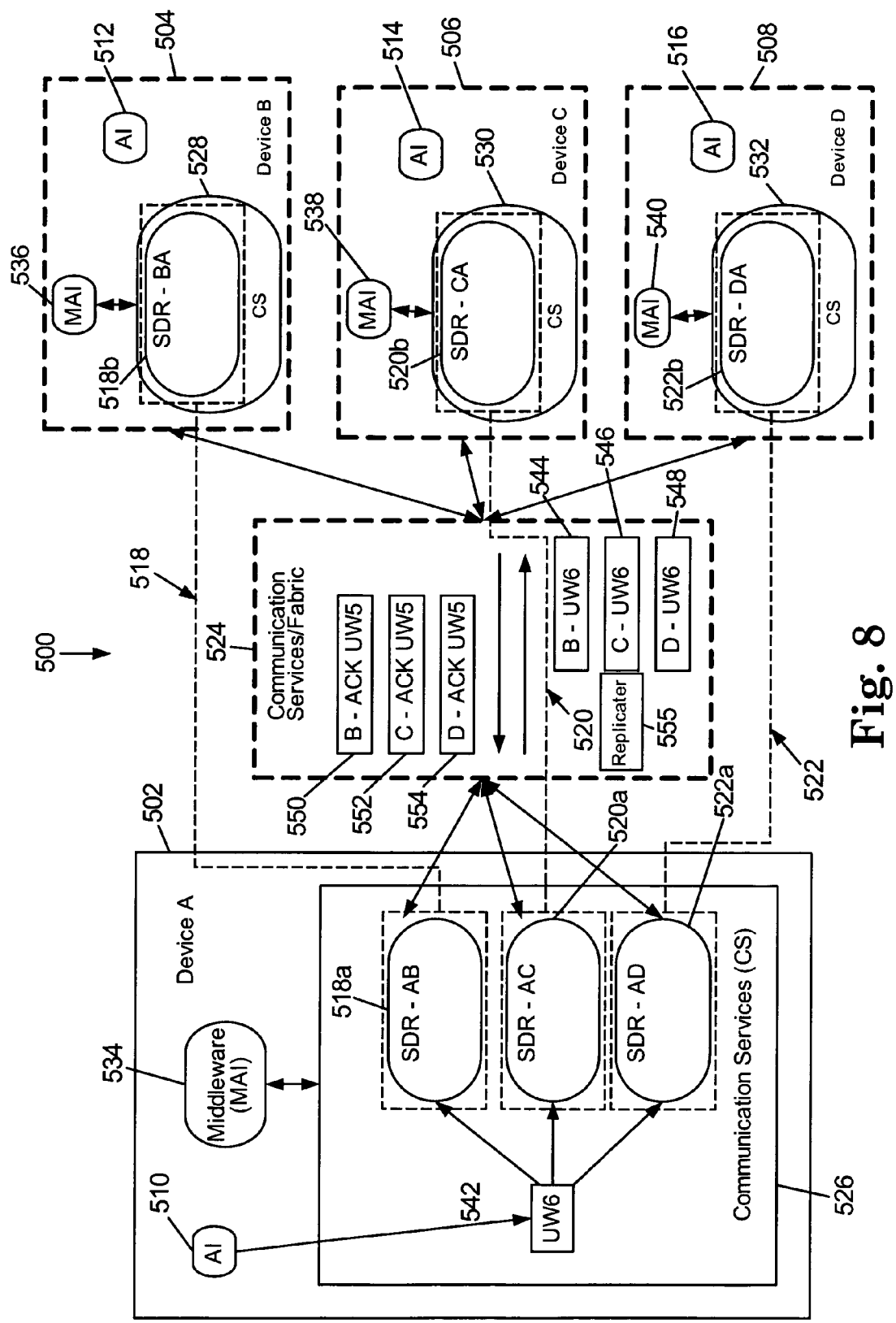
FIG. 8 is a diagram of a portion of a data processing system illustrating an example reliable multicast operation according to the present invention.

A portion of a data processing system having a reliable multicast service according to the present invention for implementing an example reliable multicast operation is illustrated generally at 500 in FIG. 8. Data processing system 100 includes a device A indicated at 502 which functions as a source device in the reliable multicast operation illustrated in FIG. 8. Data processing system 500 includes a device B indicated at 504, a device C indicated at 506, and a device D indicated at 508 which are destination devices in the reliable multicast operation illustrated in FIG. 8. Source device 502 includes a source AI 510. Destination device 504 includes a destination AI 512, destination device 506 includes a destination AI 514, and destination device 508 includes a destination AI 516. Destination AIs 512, 514, and 516 form a target multicast group for the reliable multicast operation of FIG. 8.

Although device 502 functions as a source device and devices 504, 506, and 508 operate as destination devices for the reliable multicast operation of FIG. 8, devices 502, 504, 506, and 508 can each be a source or destination device depending on the direction of communication for a given reliable multicast operation.

A SDR 518 including SDR resources 518a at device 502 and SDR resources 518b at device 504 is established between device 502 and device 504. A SDR 520 including SDR resources 520a at device 502 and SDR resources 520b at device 506 is established between device 502 and device 506. A SDR 522 including SDR resources 522a at device 502 and SDR resources 522b at device 508 is established between device 502 and device 508. The source and destination ends of each of SDRs 518, 520, and 522 communicate via a communication services/fabric 524.

Device 502 includes communication services (CS) 526. Device 504 includes CS 528, device 506 includes CS 530, and device 508 includes CS 532. CS is herein defined to be a set of communication services contained in each device participating in a reliable multicast operation. The CS ensure all reliable multicast unit of work operations are transmitted. The CS interact with middleware AIs to enable multicast join and leave operations. The CS can be implemented in software, hardware, or firmware, or in any combination of these. Other specific CS capabilities are implementation specific.

For reliable multicast services, CS or a middleware AI, such as middleware AI 534 of device 502, middleware AI 536 of device 504, middleware AI 538 of device 506, and middleware AI 540 of device 508, determines whether a given AI can join a given multicast group. The middleware AI or CS also validates access rights and reliably informs all participating devices in the multicast group of changes within the group. For a multicast leave operation, the middleware AI or CS informs the participating devices in the multicast group to remove the AI from the destination list, to complete all in-flight units of work as though the AI were still present, and to not target the removed destination AI for units of work not yet launched.

In the reliable multicast operation of FIG. 8, device 502 issues a multicast unit of work (UW6) indicated at 542. AI 510 produces UW6. CS 526 replicates UW6 and unicasts UW6 via SDR resources 518*a*, 520*a*, and 522*a* to participating multicast group destination AIs 512, 514, and 516. The replicated UW6 destine for device 504 is indicated at 544, the replicated UW6 destine for device 506 is indicated at 546, and the replicated UW6 destine for device 508 is indicated at 548.

Each of the participating multicast destination device's CS generate an ACK for each unit of work it receives. The ACK can be cumulative or on a per unit of work basis. In the example reliable multicast operation of FIG. 8, CS 528 via SDR resources 518*b* provides an ACK 550 for a multicast unit of work (UW5) received at device 504. Similarly, CS 530 via SDR resources 520*b* provides an ACK 552 for UW5 received at device 506, and CS 532 via SDR resources 522*b* provides an ACK 554 for UW5 received at device 508. ACKs 550, 552, and 554 are transmitted to source device 502 via communication services/fabric 524. CS 526 of device 502 gathers all of the acknowledgments (e.g., ACKs and NAKs) and completes the unit of work operation by informing source AI 510 of the operation status of a given unit of work multicast. CS 526 also informs source AI 510 which destination AIs, if any, did not receive the multicast unit of work as a result of an error in the multicast operation.

A given AI participates in a multicast group by performing a multicast join operation. When a join operation is successfully completed, the given AI can issue a single unit of work, and the CS of the device containing the given AI replicates the single unit of work and reliably transmits the replicated units of work to all destination AIs participating in the specified multicast group.

A given AI leaves a multicast group by performing a multicast leave operation. The multicast leave operation informs all participating multicast AI members via the CS of the device for each participating AI in the multicast group that the given AI leaving the multicast group is no longer a valid destination AI for multicast operations within the multicast group. Once participating AIs are informed that a given AI is leaving the multicast group, the participating AIs remaining in the multicast group perform the appropriate resource and in-flight unit of work recovery operations.

The reliable multicast service preferably has the same operational model as the conventional unreliable multicast services with respect to unit of work read/write support (e.g., both the reliable multicast service and the unreliable multicast service support writes but neither the reliable multicast service nor the unreliable multicast service support reads). In one embodiment, the reliable multicast service minimally provides the same semantic behavior as the conventional unreliable multicast service to permit existing applications employing conventional unreliable multicast services to employ the reliable multicast service without modification to the existing application. Thus, from the application perspective, the reliable multicast service provides the same basic services as the unreliable multicast service except the reliable multicast service is reliable.

Units of work are reliably delivered to destination AIs participating in the multicast group by the CS within each device in the multicast group without application modification. In one example embodiment, the reliable multicast service employs an agreed to multicast address to address the multicast group. A given AI in the multicast group targets the agreed to multicast address and not the individual multicast group members. The CS in each participating device is responsible for interpreting the agreed to multicast address and responding to the agreed to multicast address to perform the reliable multicast operation on behalf of the corresponding AI.

In the reliable multicast service according to the present invention, applications that cannot tolerate unit of work loss or reordering, can off-load the reliability function including the complexity and the design steps required to provided reliable communication, to the common set of CS. The off-loading of the reliability function from the application to the common set of CS permits multiple applications to benefit from sharing the CS. In addition, applications not having to deal with the reliability concerns in the multicast operations have improved performance and quality due to the ability to optimize and leverage the quality across multiple applications. In addition, the reduced complexity of a given application and reduced design steps to create and verify the given application reduce the time-to-market for the given application.

Applications can use both sender-based and receiver based communication techniques with the reliable multicast service. Unreliable multicast services only support receiver-based communication techniques. In one embodiment, AIs in a reliable multicast service use the same sender-based or receiver-based communication and memory management/ protection techniques as traditionally used by reliable connection services and as described above for the reliable datagram service.

In the reliable multicast service, logical unit of work transmission size is limited only by the size of the memory window exported (sender-based communication) or posted (receiver-based communication) by the destination AI. Receiver-based AIs can support one or multiple memory buffers as transmission targets. The receiver communication services/fabric are responsible for selecting the optimal memory buffer to target for a given unit of work based on unit of work attributes or AI input.

In the reliable multicast service, memory is protected using techniques such as Hamlyn protection mechanisms to ensure correct access rights (e.g., no access, read access, write access, read/write access, memory address range verification, and the like) are verified before access is granted to an AI.

In the reliable multicast service, sender-based communication requires all participating AIs to export identical virtual memory windows and to utilize the same protection mechanisms.

The SDRs used in the reliable multicast service assure that units of work transmitted from the source AI to the multicast destination AIs are reliable. The strong ordering mechanism in the SDR guarantees that all destination AIs within the multicast group receive the unit of work in the same defined order as transmitted from the source AI. Units of work sent by other source AIs to the multicast group using separate SDR resources may be interleaved. Strong ordering is only guaranteed on a per source-to-destination SDR resource basis.

A given unit of work is received exactly once at any destination AI participating within the multicast group. In other words, duplicate copies of units of work which may be generated during an error event or a recovery operation are detected and not delivered to the destination AI participating within the multicast group. In the reliable multicast service, the source AI and/or the CS are informed of unit of work transmission completion via acknowledgments. Types of acknowledgements include an ACK which indicates a unit of work was successively transmitted and received or a NAK which indicates an unrecoverable error was detected either within the unit of work or in its transmission.

In one embodiment, QoS is implemented for the reliable multicast service using the same techniques provided by the reliable datagram service described above. In this embodiment, QoS allows the reliable multicast operations to be prioritized relative to other traffic within the source device according to the QoS service level objectives for the device and the AIs executing in the device.

In one embodiment of the reliable multicast service, the source device CS functions as the unit of work replication component instead of a fabric component, such as a switch or router, used with the unreliable multicast service. In one embodiment, the CS issues a series of units of work unicast to each destination AI participating within the target multicast group. Each unicast is acknowledged (e.g., positively with an ACK or negatively with a NAK) to indicate the operation's success or failure. When a CS has received acknowledgments from all, or a predetermined percentage of, destination AIs in the target multicast group and has completed recovery from recoverable errors, the CS completes the unit of work multicast operation and, if required based on application parameters, informs the source AI of any errors.

In an alternative embodiment of the reliable multicast service, a fabric component (e.g., a switch or router), such as indicated at 555 in FIG. 8, functions as the unit of work replication component instead of the source device CS. In this alternative embodiment, however, the CS still performs the other above and below described CS functions including verifying that all, or a predetermined percentage of, destination AIs within the multicast group reliably receives each unit of work transmitted in the reliable multicast operation.

Each SDR coupling a source AI to a destination AI within the target multicast group executes independently. Thus, there is no coordination between SDRs in terms of unit of work time stamps/sequence numbers, acknowledgments, and the like. The CS within the source device is responsible for correlating independent SDR transmissions and acknowledgments and generating an appropriate completion event.

Error recovery in the reliable multicast service is implemented by performing a resynchronization event between the source AI and impacted destination AI of the multicast group using the same techniques provided by the above-described reliable datagram service. The primary difference between the reliable multicast and the reliable datagram is that an error can involve multiple destination AIs in the reliable multicast, and therefore, multiple resynchronization operations may need to be implemented before the unit of work transaction is considered complete in the reliable multicast service.

Example Multicast Group Management Operations

In one embodiment, reliable multicast group management operations are performed based on existing multicast group management standards (e.g., Internet Group Management Protocol (IGMP) multicasting standard) to obtain maximum leverage from the existing standards. Nevertheless, the reliable multicast group management operations necessarily vary from the existing multicast group management standards, such as described below. The CS associated with each reliable multicast AI must track group membership changes. For each membership change, a control management message must be reliably exchanged and managed by the associated middleware AIs for each device.

In one embodiment, when an AI issues a multicast group join operation, each destination middleware AI or CS makes the following determinations and responds appropriately. Each destination middleware AI or CS determines whether sufficient resources are present to add the new AI to the multicast group. If a participating device or the new AI lacks the resources to support the new multicast group membership, the reliable multicast operation is failed. Each destination middleware AI or CS determines whether the AI is authorized to join the multicast group (e.g., access rights verification). If the AI is not authorized to participate, the reliable multicast operation is failed. Each destination middleware AI or CS determines whether all current group members are capable of exchanging units of work with the new AI. If complete connectivity is not possible, the join operation is failed with the appropriate error indication.

In one embodiment, when an AI issues a multicast group leave operation, each destination middleware AI or CS performs the following steps. The destination middleware AI or CS removes the AI as a valid destination AI so that subsequent units of work will not target the removed AI. The destination middleware AI or CS mark in-flight units of work to indicate that the CS should not treat an acknowledgment not being returned for the target AI as a non-recoverable error. In one embodiment, the destination middleware AI or CS informs all multicast group member AIs that the leaving AI is removed to allow the AIs the option of taking appropriate action. In one embodiment, a non-recoverable error which isolates a given AI is treated as an unplanned multicast group leave operation.

In one embodiment, for each of the multicast group management operations, the AI is explicitly informed or involved in the group membership changes. In another embodiment, the AI relegates any involvement in the group membership changes to the associated middleware AI or CS and the AI itself takes no responsibility for the group membership changes. The choice between these two embodiments is implementation dependent and based on AI service objectives. For example, if an AI is designed to replicate data to multiple physical sites to ensure data integrity in the event of disaster, the AI can decide that the number of sites currently receiving the units of work is not relevant and only focus on ensuring that the number is greater than some application-specific minimum. On the other hand, in another example, a reliable multicast AI is used to synchronously update multiple sites to ensure that some data lists (e.g., price lists) are consistent and accurate, and the reliable multicast AI ensures that the multicast group is correctly created and that all members receive the reliable, synchronous updates.

Reliable multicast groups require complete membership knowledge in order to function. In addition, some operations, such as setting up of memory windows and protection operations associated with sender-based communication, require additional multicast group management operations to be provided by the AI, the middleware AI, or the CS. The following are example multicast group management operations which are implemented along with the multicast group join and leave operations to provide a suitable reliable multicast service.

In a get attribute operation, an AI, middleware AI, or CS queries the current attributes of the multicast group, such as current group membership, multicast addressing, and the like.

In a set attribute operation, an AI, middleware AI, or CS sets the multicast group attributes, such as the multicast address, protection services, and the like.

In a remove member operation, a middleware AI performs an explicit multicast group leave operation without involving the impacted AI. In one embodiment, the remove member operation is performed based on service level objectives, AI state information (e.g., connectivity lost, AI or CS is unresponsive, etc.), protection violations, and the like.

Unit of Work Completion Processing

Each source CS must verify that all, or a predetermined percentage of, destination AIs within the multicast group reliably receives each unit of work transmitted from the source CS. There are a variety of techniques which are suitable to implement the unit of work completion processing for the reliable multicast service. For example, in one embodiment, the source CS employs an acknowledgement counter which is incremented or decremented with each acknowledgment received. In one form of this embodiment, the CS generates a completion event when the counter indicates that all, or a predetermined percentage of, destination AIs participating in the multicast group have acknowledged the unit of work has been received.

In another embodiment, the source CS employs, a bit-mask array which assigns a unique bit for each destination AI participating in the multicast group and clears each bit as each acknowledgment is received. All of these unit of work completion processing implementations must assure that the CS does not generate a completion event to the source AI until all, or a predetermined percentage of, destination AIs participating in the multicast group have acknowledged the unit of work has been received or an unrecoverable error has been detected when processing the unit of work to a given destination AI.

In one embodiment, the source CS includes a timing window. If the timing window expires without the necessary conditions for a completion event occurring, then the middleware AI or CS tracks and resolves the missing acknowledgment(s).

Figure 9:
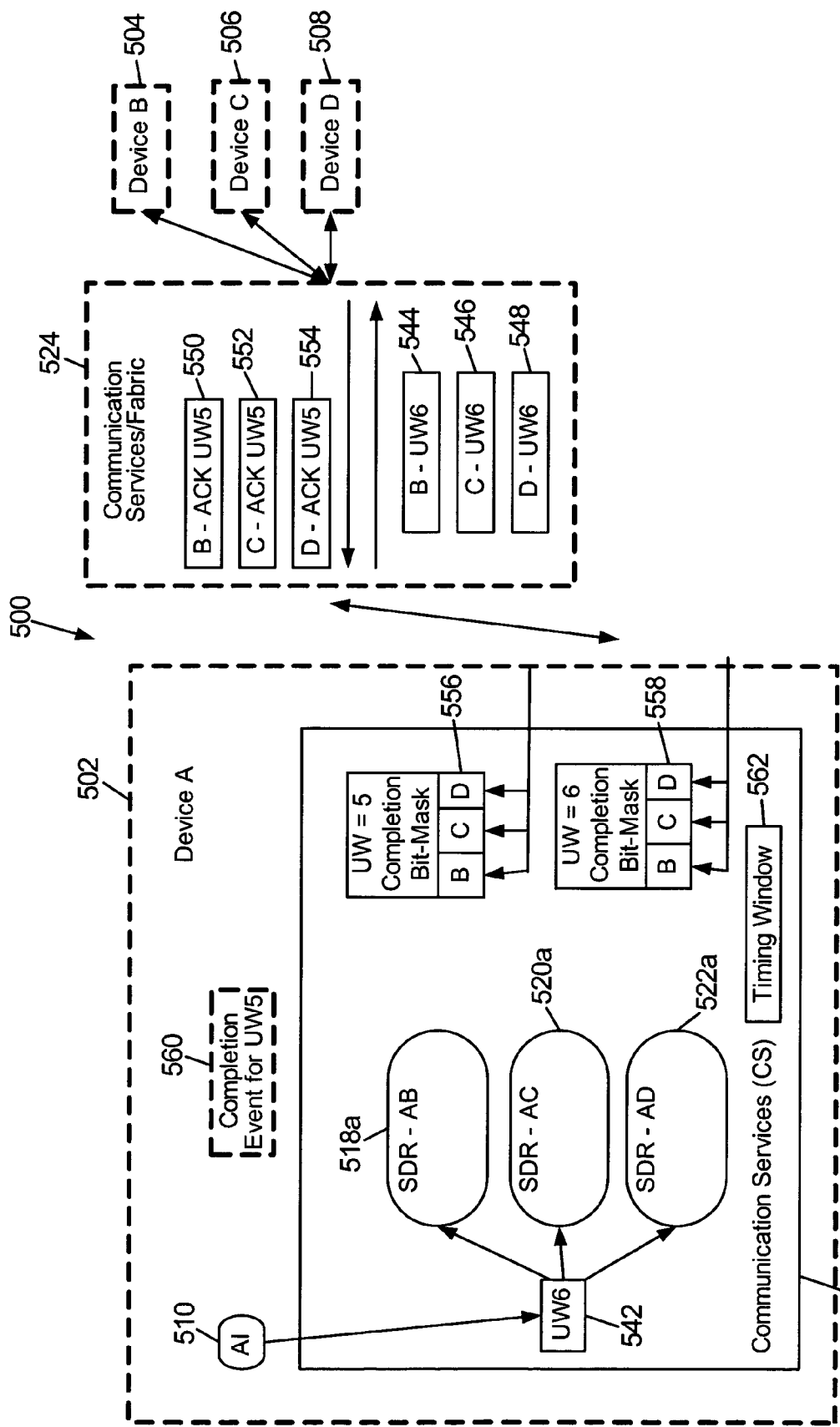
FIG. 9 is a diagram of a portion of the data processing system of FIG. 8 illustrating an example unit of work completion processing for the reliable multicast operation employing a unit of work completion bit-mask.

An example unit of work completion processing operation for the data processing system 500 is illustrated in diagram form in FIG. 9. In FIG. 9, the unit of work completion event is for UW5. Device A indicated at 502 includes CS 526 which maintains a bit-mask for each in-flight unit of work. For example, in the unit of work completion processing for the reliable multicast operation of FIG. 9, a unit of work completion bit-mask is indicated at 556 for UW5 and a unit of work completion bit-mask is indicated at 558 for UW6. Each bit in the UW completion bit-mask corresponds to a group member, such as bit B corresponding to device B indicated at 504, bit C corresponding to device C indicated at 506, and bit D corresponding to device D indicated at 508. The state of the bits in the unit of work completion bit mask represent whether the corresponding device has acknowledged the unit of work.

The number of units of work which can be tracked is implementation dependent and based upon the resource availability. For example, the example UW completion processing for the reliable multicast service operations of FIG. 9 illustrates two unit of work in-flight trackings. As acknowledgments are received by device A indicated at 502, the corresponding bit in the UW completion bit mask is cleared. When the UW completion bit mask is all cleared (e.g., all zeros), a completion event, such as indicated at 560 for UW5, is signaled to source AI 510. To ensure proper ordering, the completion event for UW6 can not be issued until the completion event 560 has been issued for UW5.

CS 526 includes a timing window 562. If timing window 562 expires without the necessary conditions for completion event 560 for UW5 occurring, then CS 526 tracks and resolves the missing acknowledgments indicated in UW completion bit-mask 556.

Figure 10:
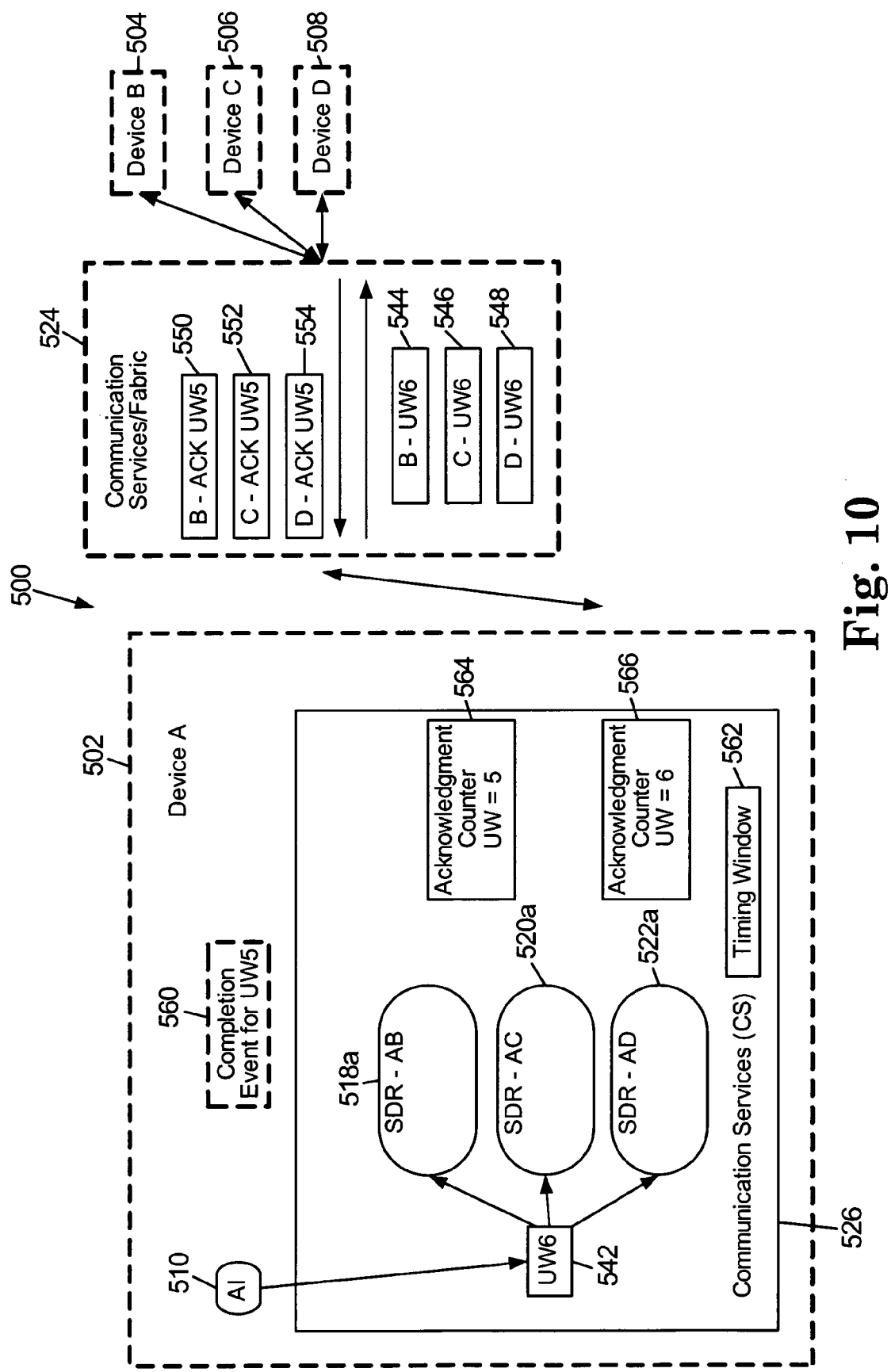
FIG. 10 is a diagram of a portion of the data processing system of FIG. 8 illustrating an example unit of work completion processing for the reliable multicast operation employing an acknowledgment counter.

Another example unit of work completion processing operation for another embodiment of data processing system 500 is illustrated in diagram form in FIG. 10. In FIG. 10, the unit of work completion event is for UW5. Device A indicated at 502 includes CS 526 which maintains an acknowledgment counter 564 which is incremented or decremented with each acknowledgment received. CS 526 generates a completion event, such as indicated at 560 for UW5, when the acknowledgment counter 564 indicates that all three destination devices 504, 506, and 508 participating in the multicast group have acknowledged the unit of work UW5 has been received. CS 526 also maintains an acknowledgment counter 566 for UW6 which operates similar to acknowledgment counter 564 to track acknowledgments received corresponding to the multicast UW6. The number of units of work which can be tracked by the acknowledgment counter is implementation dependent and based upon resource availability. To ensure proper ordering, the completion event for UW6 cannot be issued until the completion 560 has been issued for UW5. If timing window 562 expires without the necessary conditions for completion event 560 for UW5 occurring, then CS 526 tracks and resolves the missing acknowledgments.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data processing system comprising:
    a source device participating in a multicast group and including:
        a first source application instance (AI) producing a first unit of work stream; and
        communication services (CS);
    multiple destination devices participating in the multicast group, each destination device in the multicast group including:
        at least one destination AI which consumes units of work; and CS;
    communication services/fabric providing communication between the source device and the multiple destination devices;
    multiple source and destination resources (SDRs), each SDR implementing an independent reliable transport service between the source device and a corresponding one of the multiple destination devices in the multicast group for delivery of the first unit of work stream at the corresponding one of the multiple destination devices and guaranteeing strong ordering of the first unit of work stream received at the corresponding one of the multiple destination devices, wherein each SDR includes:
        first SDR resources at the source device having at least one queue configured to hold transmitted from the source device to the corresponding one of the multiple destination devices but not acknowledged units of work and not yet transmitted units of work; and
        second SDR resources at the corresponding one of the multiple destination devices having state information including an expected next sequence number value indicating an expected defined order corresponding to a next unit of work to be received; and
    wherein the CS in the source device correlates the independent reliable transport services and verifies that a predetermined percentage of destination AIs in the multicast group reliably receives each unit of work or a cumulative set of units of work in the first unit of work stream in the expected defined order.

2. The data processing system of claim 1 wherein the predetermined percentage is 100% of the destination AIs.

3. The data processing system of claim 1 wherein the predetermined percentage is less than 100% of the destination AIs.

4. The data processing system of claim 1 wherein the CS in the source device includes:
    an acknowledgement counter which counts acknowledgements received from the corresponding destination devices in the multicast group indicating that the corresponding destination device has received a unit of work or a cumulative set of units of work in the first unit of work stream.

5. The data processing system of claim 4 wherein the CS in the source device generates a completion event when the acknowledgement counter indicates that the predetermined percentage of destination AIs in the multicast group have acknowledged the unit of work or a cumulative set of units of work has been received.

6. The data processing system of claim 1 wherein the CS in the source device includes:
    a bit-mask array which assigns a unique bit for each destination AI in the multicast group and clears each bit as a corresponding acknowledgment is received from the corresponding destination device in the multicast group indicating that the corresponding destination device has received a unit of work or the cumulative set of units of work in the first unit of work stream.

7. The data processing system of claim 6 wherein the CS in the source device generates a completion event when the bit-mask array has the predetermined percentage of bits cleared in the bit-mask array indicating that the predetermined percentage of destination AIs in the multicast group have acknowledged the unit of work or the cumulative set of units of work has been received.

8. The data processing system of claim 1 wherein the CS in the source device replicates the first unit of work stream for transmission to the destination AIs in the multicast group.

9. The data processing system of claim 1 wherein the communication services/fabric includes at least one replicater component for replicating the first unit of work stream for transmission to the destination AIs in the multicast group.

10. The data processing system of claim 1 wherein the data processing system further comprises:
    at least one middleware AI.

11. The data processing system of claim 10 wherein the CS in the source device includes a timing window and if the timing window expires without necessary conditions for a completion event occurring, then the middleware AI or CS tracks and resolves missing acknowledgments.

12. The data processing system of claim 10 wherein a given AI joins the multicast group by performing a multicast join operation, and the middleware AI or CS determines whether the given AI can join the multicast group, validates access rights, and informs the devices participating in the multicast group of changes in the group.

13. The data processing system of claim 10 wherein a given AI leaves the multicast group by performing a multicast leave operation, and the middleware AI or CS informs the devices participating in the multicast group to remove the given AI from the destination list, to complete all in-flight units of work as though the given AI were still present, and to not target the given AI for units of work not yet launched.

14. The data processing system of claim 10 wherein an AI, middleware AI, or CS performs a get attribute operation to query current attributes of the multicast group.

15. The data processing system of claim 10 wherein an AI, middleware AI, or CS performs a set attribute operation to set multicast group attributes.

16. The data processing system of claim 10 wherein middleware AI performs a remove member operation to remove a given AI from the multicast group without involving the given AI.

17. The data processing system of claim 1 wherein an agreed to multicast address is employed to address AIs in the multicast group.

18. The data processing system of claim 17 wherein the CS in each device participating in the multicast group interprets the agreed to multicast address and responds to the agreed to multicast address to perform a reliable multicast operation on behalf of the corresponding destination AI.

19. The data processing system of claim 1 wherein the data processing system performs a reliable multicast operation having substantially the same semantic behavior relative to a given AI as an unreliable multicast operation.

20. The data processing system of claim 1 wherein the multiple SDRs are grouped into multiple SDR groups, wherein each of the multiple SDR groups includes at least one SDR and is assigned a unique priority level for effecting throughput and response time of units of work transmitted by the at least one SDR.

21. The data processing system of claim 1 wherein the source device also functions as a destination device and at least one of the destination devices also functions as a source device.

22. The data processing system of claim 1 wherein each SDR includes:
source SDR resources, at the source device, transmitting the first unit of work stream in a serial unit of work stream having units of work in a defined order over the communication services/fabric; and
destination SDR resources, at the corresponding destination device, receiving the serial unit of work stream, and demultiplexing the serial unit of work stream into units of work provided to the corresponding at least one destination AI.

23. The data processing system of claim 22 wherein the destination SDR resources provide a negative acknowledgement (NAK) for a unit of work received ahead of its defined order.

24. The data processing system of claim 22 wherein the destination SDR resources drop a unit of work received ahead of its defined order.

25. The data processing system of claim 22 wherein the destination SDR resources provide a positive acknowledgement (ACK) for each unit of work which is successfully received and processed by the destination SDR resources.

26. The data processing system of claim 22 wherein the destination SDR resources provide a cumulative positive acknowledgement (ACK) for a set of units of work that indicate that all units of work in the set of units of work up to and including a current unit of work have been successfully received and processed by the destination SDR resources.

27. The data processing system of claim 17 wherein the destination SDR resources drop a unit of work in response to an indication that the unit of work is a duplicate unit of work.

28. A method of processing data comprising:
producing a first unit of work stream with a first source application instance (AI) at a source device participating in a multicast group;
reproducing the first unit of work stream;
establishing multiple source and destination resources (SDRs), each SDR including:
first SDR resources at the source device having at least one queue for holding transmitted from the source device to a corresponding one of the multiple destination devices but not acknowledged units of work and not yet transmitted units of work; and
second SDR resources at the corresponding one of multiple destination devices participating in the multicast group having state information including an expected next sequence number value indicating an expected defined order corresponding to a next unit of work to be received;
implementing corresponding multiple independent reliable transport services with the multiple SDRs, each independent reliable transport service being implemented between the source device and the corresponding one of multiple destination devices, each destination device having at least one destination AI;
multicasting the reproduced first unit of work stream over a communication services/fabric with the multiple independent reliable transport services;
guaranteeing strong ordering of the first unit of work stream received at the corresponding one of multiple destination devices; and
correlating the independent reliable transport services including verifying that a predetermined percentage of destination devices in the multicast group reliably has received each unit of work or a cumulative set of units of work in the first unit of work stream in the expected defined order.

29. The method of claim 28 further comprising the step of:
consuming the fat unit of work stream with the at least one destination AI at each of the multiple destination devices participating in the multicast group.

30. The method of claim 28 wherein the predetermined percentage is 100% of the destination devices.

31. The method of claim 28 wherein the predetermined percentage is less than 100% of the destination devices.

32. The method of claim 28 further comprising the steps of:
providing acknowledgments from the corresponding destination devices in the multicast group indicating that the corresponding destination device has received a unit of work or a cumulative set of units of work in the first unit of work stream; and
counting acknowledgements received at the source device.

33. The method of claim 32 further comprising the step of:
generating a completion event when the acknowledgement counter indicates that the predetermined percentage of destination devices in the multicast group have acknowledged the unit of work or the cumulative set of units of work has been received.

34. The method of claim 28 further comprising the steps of:
assigning a unique bit for each destination device in the multicast group in a bit-mask array; and
clearing each bit as a corresponding acknowledgment is received from the corresponding destination device in the multicast group indicating that the corresponding destination device has received a unit of work or a cumulative set of units of work in the first unit of work stream.

35. The method of claim 34 further comprising the step of:
generating a completion event when the bit-mask array has the predetermined percentage of bits cleared in the bit-mask array indicating that the predetermined percentage of destination AIs in the multicast group have acknowledged the unit of work or the cumulative set of units of work has been received.

36. The method of claim 28 further comprising the step of:
maintaining a timing window; and
if the timing window expires without necessary conditions for a completion event occurring, tracking and resolving missing acknowledgments.

37. The method of claim 28 further comprising the steps of:
performing a multicast join operation to join a given AI into the multicast group including the steps of:
determining whether the given AI can join the multicast group;
validating access rights; and
informing the devices participating in the multicast group of changes in the group.

38. The method of claim 28 further comprising the steps of:
performing a multicast leave operation to permit a given AI to leave the multicast group including informing the devices participating in the multicast group to remove the given AI from the destination list, to complete all in-flight units of work as though the given AI were still present, and to not target the given AI for units of work not yet launched.

39. The method of claim 28 further comprising the step of:
performing a get attribute operation to query current attributes of the multicast group.

40. The method of claim 28 further comprising the step of:
performing a set attribute operation to set multicast group attributes.

41. The method of claim 28 further comprising the step of:
performing a remove member operation to remove a given AI from the multicast group without involving the given AI.

42. The method of claim 28 further comprising the step of:
addressing AIs in the multicast group with an agreed to multicast address.

43. The method of claim 28 further comprising the steps of:
grouping the multiple reliable transport services into multiple reliable transport service groups, wherein each of the multiple reliable transport service groups includes at least one reliable transport service; and
assigning a unique priority level to each reliable transport service group for effecting throughput and response time of units of work transmitted by the at least one reliable transport service.

44. The method of claim 28 wherein the source device also functions as a destination device and at least one of the destination devices also functions as a source device.

45. The method of claim 28 further comprising the step of:
providing a negative acknowledgement (NAK) for a unit of work received at a corresponding destination device ahead of a defined order assigned to the unit of work.

46. The method of claim 28 further comprising the step of:
dropping a unit of work received at a corresponding destination device ahead of a defined order assigned to the unit of work.

47. The method of claim 28 further comprising the step of:
temporarily storing a unit of work received at a corresponding destination device ahead of a defined order assigned to the unit of work.

48. The method of claim 47 further comprising the step of:
performing a resynchronization operation to recover a missing intermediate unit of work.

49. The method of claim 28 further comprising the step of:
providing a positive acknowledgement (ACK) for each unit of work which is successfully received and processed at a corresponding destination device.

50. The method of claim 28 further comprising the step of:
providing a cumulative positive acknowledgement (ACK) for a set of units of work that indicate that all units of work in the set of units of work up to and including a current unit of work have been successfully received and processed at a corresponding destination device.

51. The method of claim 28 further comprising the steps of:
indicating that the unit of work is a duplicate unit of work based on the unit of work being received at a corresponding destination device behind a defined order assigned to the unit of work; and
dropping the unit of work in response to the indication that the unit of work is a duplicate unit of work.

\* \* \* \* \*

UNITED STATES PATENT AND TRADEMARK OFFICE
CERTIFICATE OF CORRECTION

PATENT NO. : 7,346,699 B1  Page 1 of 1
APPLICATION NO. : 09/578019
DATED : March 18, 2008
INVENTOR(S) : Michael R. Krause et al.

It is certified that error appears in the above-identified patent and that said Letters Patent is hereby corrected as shown below:

In column 6, line 12, after "operation," delete "A's" and insert -- AIs --, therefor.

In column 6, line 13, after "source" delete "A's" and insert -- AIs --, therefor.

In column 6, line 44, after "middleware" delete "A's" and insert -- AIs --, therefor.

In column 6, line 47, after "source" delete "A's" and insert -- AIs --, therefor.

In column 6, line 47, after "destination" delete "A's" and insert -- AIs --, therefor.

In column 6, line 49, after "destination" delete "A's" and insert -- AIs --, therefor.

In column 9, line 22, after "middleware" delete "A's" and insert -- AIs --, therefor.

In column 28, line 11, in Claim 29, delete "fat" and insert -- first --, therefor.

Signed and Sealed this

Twenty-second Day of July, 2008

JON W. DUDAS
*Director of the United States Patent and Trademark Office*